United States Patent
Verma et al.

(10) Patent No.: US 11,452,098 B2
(45) Date of Patent: Sep. 20, 2022

(54) DUAL BAND CHANNEL BONDING AND PUNCTURING

(71) Applicant: QUALCOMM Incorporated, San Diego, CA (US)

(72) Inventors: Lochan Verma, San Diego, CA (US);
Bin Tian, San Diego, CA (US);
Sameer Vermani, San Diego, CA (US);
Lin Yang, San Diego, CA (US);
Youhan Kim, Saratoga, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 105 days.

(21) Appl. No.: 16/387,261

(22) Filed: Apr. 17, 2019

(65) Prior Publication Data

US 2019/0327740 A1 Oct. 24, 2019

Related U.S. Application Data

(60) Provisional application No. 62/660,643, filed on Apr. 20, 2018.

(51) Int. Cl.
*H04W 4/00* (2018.01)
*H04W 72/04* (2009.01)

(52) U.S. Cl.
CPC .............................. *H04W 72/0453* (2013.01)

(58) Field of Classification Search
None
See application file for complete search history.

(56) References Cited

U.S. PATENT DOCUMENTS 10,154,520 B1 * 12/2018 Hedayat ............ H04W 74/0833
10,219,271 B1 * 2/2019 Hedayat ................ H04L 5/0055
(Continued)

FOREIGN PATENT DOCUMENTS

WO WO-2017111567 A2 6/2017
WO WO-2019089598 A2 5/2019

OTHER PUBLICATIONS

Deng D-J., et al., "IEEE 802.11ax: Highly Efficient WLANs for Intelligent Information Infrastructure," IEEE Communications Magazine, IEEE Service Center, Piscataway, US, vol. 55 (12), Dec. 1, 2017, pp. 52-59, XP011674426, ISSN: 0163-6804, DOI: 10.1109/MCOM.2017.1700285 [retrieved on Dec. 13, 2017] p. 55, figure 2.
(Continued)

*Primary Examiner* — Gerald A Smarth
(74) *Attorney, Agent, or Firm* — Dang M. Vo

(57) ABSTRACT

An access point (AP) may signal management frames that include two operation information fields indicating two channel widths for different classes of wireless stations (STAs). STAs may identify one of the two operation information fields based on capabilities of the STA (e.g., whether or not the STA is capable of dual band channel bonding, resource unit or physical channel puncturing, etc.). In some cases, one operation information field may indicate a channel width within a first and second frequency band (e.g., within the 5 GHz band and the 6 GHz band), as well as a puncturing scheme associated with the channel width. In some cases, the operation information field may indicate a dual band channel bonding configuration, where two frequency segments associated with the channel bonding configuration are in two different frequency bands. In some cases, a tightened spectral mask may be used for such dual band channel bonding configurations.

38 Claims, 26 Drawing Sheets

(56) References Cited

U.S. PATENT DOCUMENTS

| | | | |
|---|---|---|---|
| 10,708,932 B2* | 7/2020 | Kim | H04W 16/14 |
| 2016/0050634 A1* | 2/2016 | Seok | H04W 52/146 |
| | | | 370/338 |
| 2016/0088641 A1* | 3/2016 | Kwon | H04L 1/00 |
| | | | 370/329 |
| 2016/0099796 A1* | 4/2016 | Yang | H04L 27/12 |
| | | | 714/776 |
| 2016/0242177 A1* | 8/2016 | Seok | H04L 69/22 |
| 2016/0301500 A1* | 10/2016 | Suh | H04L 27/2613 |
| 2017/0006608 A1 | 1/2017 | Josiam et al. | |
| 2017/0041929 A1* | 2/2017 | Noh | H04L 5/0094 |
| 2017/0048034 A1* | 2/2017 | Bharadwaj | H04W 72/082 |
| 2017/0126456 A1* | 5/2017 | Lee | H04L 27/2621 |
| 2017/0181136 A1* | 6/2017 | Bharadwaj | H04W 84/12 |
| 2017/0223693 A1 | 8/2017 | Kim et al. | |
| 2017/0311325 A1 | 10/2017 | Cariou et al. | |
| 2017/0325202 A1* | 11/2017 | Verma | H04L 5/0053 |
| 2017/0366329 A1 | 12/2017 | Cao et al. | |
| 2018/0302858 A1 | 10/2018 | Son et al. | |

OTHER PUBLICATIONS

Partial International Search Report—PCT/US2019/028105—ISA/EPO—dated Jul. 5, 2019.
International Search Report and Written Opinion—PCT/US2019/028105—ISA/EPO—dated Sep. 4, 2019.

* cited by examiner

DUAL BAND CHANNEL BONDING AND PUNCTURING

CROSS REFERENCES

The present Application for Patent claims the benefit of U.S. Provisional Patent Application No. 62/660,643 by Verma, et al., entitled "Dual Band Channel Bonding and Puncturing," filed Apr. 20, 2018, assigned to the assignee hereof, and expressly incorporated herein by reference in its entirety.

BACKGROUND

The following relates generally to wireless communications, and more specifically to dual band channel bonding and puncturing.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (e.g., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

In some cases, devices in a WLAN (e.g., APs and STAs) may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, the 900 MHz band, etc. The unlicensed spectrum may also include other frequency bands (e.g., such as the 6 GHz band). The wireless connection between an AP and STA may be referred to as a channel or link. Users may access these radio frequency spectrum bands using various contention-based protocols (e.g., as specified by one or more versions of IEEE 802.11). Each band (e.g., the 5 GHz band) may contain multiple channels (e.g., each spanning 20 MHz in frequency, 40 MHz in frequency, 80 MHz in frequency, etc.), each of which may be usable by an AP or STA. In some cases, certain bandwidth within a frequency band may be occupied by incumbents (e.g., radars in the 5 GHz band and/or the 6 GHz band). Such occupation of the communication medium may adversely affect bandwidth usable by communicating devices. Improved methods for utilizing wireless resources (e.g., channels or bandwidth allocated for communications between devices) in these scenarios may be thus desired.

SUMMARY

The described techniques relate to improved methods, systems, devices, or apparatuses that support dual band channel bonding and puncturing. Generally, the described techniques provide for mechanisms to convey basic service set (BSS) bandwidth (e.g., channel width) to clients (e.g., wireless stations (STAs)) associated with various capabilities to efficiently utilize wireless communications resources in the presence of incumbent (e.g., radar) occupied bandwidth. Described techniques may further provide for dual band channel bonding, such that a channel bonding configuration may include frequency segments located within different frequency bands (e.g., such as two non-contiguous frequency segments located within a 5 GHz band and a 6 GHz band).

An access point (AP) may periodically signal broadcast frames (e.g., management frames or beacons) to enable STAs within wireless range of the AP to establish (or maintain) a communication link with the AP. An AP may transmit a management frame that includes two operation information fields (e.g., in an operation element), where each operation information field may indicate channel width (e.g., BSS bandwidth) for a certain class of STAs. For example, some wireless devices (e.g., a first class of STAs which may include for example, legacy devices (e.g., devices operating according to versions of IEEE 802.11 prior to IEEE 802.11ax, including IEEE 802.11ac (VHT) devices), IEEE 802.11ax (HE) generation-1 devices, etc.) may identify or determine a first channel width from the first operation information field, and other wireless devices (e.g., a second class of STAs which may include, for example, IEEE 802.1 lax (HE) generation-2 devices, IEEE 802.11 be (EHT) devices, and beyond, etc.) may identify or determine a second channel width from the second operation information field. The indicated first and second channel widths may be determined by the AP based on, for example, differences in capabilities associated with the two classes of STAs (e.g., such as dual band channel bonding capabilities, puncturing capabilities, etc.). Consequently, the first class of STAs may communicate with the AP according to the first channel width and the second class of STAs may communicate with the AP according to the second channel width.

In some examples, the AP may identify one or more incumbent occupied bandwidths (e.g., bandwidths used or occupied by radar) within a second channel width (e.g., which may be the broader or overall BSS bandwidth selected by the AP for communications). The AP may determine a puncture status for resource units (RUs) or physical channels within the second channel width (e.g., a puncturing scheme may be determined such that any incumbent occupied bandwidth is punctured). In some cases, the first class of STAs may not support punctured communications, while the second class of STAs may support punctured communications. As such, the AP may indicate a first channel width (e.g., reduced channel width) in the first operation information field, and may indicate a second channel width and a puncturing scheme in the second operation information field.

According to other aspects of the disclosure, an AP may select a dual band channel bonding configuration (e.g., a channel bonding configuration with a first frequency segment within a first frequency band and a second frequency segment within a second frequency band), and may transmit a management frame including an operation information field that indicates the selected dual band channel bonding configuration. In some cases, tightened spectral masks (e.g., compared to channel bonding configurations with both frequency segments in a same band) may be used for each segment of a dual band channel bonding configuration.

Further, capabilities associated with techniques described above (e.g., dual band channel bonding capabilities, puncturing capabilities, etc.) may be signaled via capabilities elements. For example, a STA (e.g., a STA within the second class of STAs) may transmit a capabilities element to an AP. The capabilities element may indicate whether the wireless STA supports a dual band channel bonding configuration, whether the wireless STA supports reception of physical layer convergence procedure (PLCP) protocol data units (PPDUs) with preamble puncturing, whether the wireless STA supports transmission of PPDUs with preamble puncturing, whether the wireless STA supports operation as a beamformer in puncture sounding procedures, whether the wireless STA supports operation as a beamformee in puncture sounding procedures, etc.

A method of wireless communication at a wireless STA is described. The method may include receiving a management frame including a first operation information field indicating a first channel width within a first frequency band, a second operation information field indicating a second channel width within one or both of the first frequency band or a second frequency band and a puncturing scheme for the second channel width and transmitting to an AP or receiving a transmission from the AP using the second channel width based on the puncturing scheme.

An apparatus for wireless communication at a wireless STA is described. The apparatus may include a processor, memory in electronic communication with the processor, and instructions stored in the memory. The instructions may be executable by the processor to cause the apparatus to receive a management frame including a first operation information field indicating a first channel width within a first frequency band, a second operation information field indicating a second channel width within one or both of the first frequency band or a second frequency band and a puncturing scheme for the second channel width and transmit to an AP or receive a transmission from the AP using the second channel width based on the puncturing scheme.

Another apparatus for wireless communication at a wireless STA is described. The apparatus may include means for receiving a management frame including a first operation information field indicating a first channel width within a first frequency band, a second operation information field indicating a second channel width within one or both of the first frequency band or a second frequency band and a puncturing scheme for the second channel width and transmitting to an AP or receiving a transmission from the AP using the second channel width based on the puncturing scheme.

A non-transitory computer-readable medium storing code for wireless communication at a wireless STA is described. The code may include instructions executable by a processor to receive a management frame including a first operation information field indicating a first channel width within a first frequency band, a second operation information field indicating a second channel width within one or both of the first frequency band or a second frequency band and a puncturing scheme for the second channel width and transmit to an AP or receive a transmission from the AP using the second channel width based on the puncturing scheme.

Some examples of the method, apparatuses, and non-transitory computer-readable medium described herein may further include operations, features, means, or instructions for determining a puncture status for each resource unit associated with the second channel width based on the indicated puncturing scheme. Some examples of the method, apparatuses, and non-transitory computer-readable medium described herein may further include operations, features, means, or instructions for transmitting to the AP or receiving the transmission from the AP may be based on the puncture status for each resource unit associated with the second channel width. In some examples of the method, apparatuses, and non-transitory computer-readable medium described herein, the second operation element indicates an eight bit bitmap, and the puncture status for each resource unit may be determined based on the eight bit bitmap.

Some examples of the method, apparatuses, and non-transitory computer-readable medium described herein may further include operations, features, means, or instructions for determining a puncture status for each physical channel within the second channel width based on the indicated puncturing scheme. Some examples of the method, apparatuses, and non-transitory computer-readable medium described herein may further include operations, features, means, or instructions for transmitting to the AP or receiving the transmission from the AP may be based on the puncture status for each physical channel within the second channel width. In some examples of the method, apparatuses, and non-transitory computer-readable medium described herein, the second operation element indicates an eight bit bitmap, and the puncture status for each physical channel within the second channel width may be determined based on the eight bit bitmap.

Some examples of the method, apparatuses, and non-transitory computer-readable medium described herein may further include operations, features, means, or instructions for determining, based on the second operation information field, a first channel center frequency associated with the second channel width and a second channel center frequency associated with the second channel width. In some examples of the method, apparatuses, and non-transitory computer-readable medium described herein, the second operation information field indicates the second channel width, the first channel center frequency, and the second channel center frequency.

Some examples of the method, apparatuses, and non-transitory computer-readable medium described herein may further include operations, features, means, or instructions for transmitting to the AP or receiving the transmission from the AP may be based on the second channel width, the determined first channel center frequency, and the determined second channel center frequency. In some examples of the method, apparatuses, and non-transitory computer-readable medium described herein, the first channel width may be based on the puncturing scheme. In some examples of the method, apparatuses, and non-transitory computer-readable medium described herein, the first frequency band includes a 5 GHz band and the second frequency band includes a 6 GHz band.

A method of wireless communication at a wireless STA is described. The method may include receiving a management frame including an operation information field, identifying a channel bonding configuration based on the operation information field, where the channel bonding configuration is based on a first frequency segment within a first frequency band and a second frequency segment within a second frequency band, and transmitting to an AP or receiving a transmission from the AP using the first frequency segment and the second frequency segment based on the identified channel bonding configuration.

An apparatus for wireless communication at a wireless STA is described. The apparatus may include a processor, memory in electronic communication with the processor, and instructions stored in the memory. The instructions may be executable by the processor to cause the apparatus to receive a management frame including an operation information field, identify a channel bonding configuration based on the operation information field, where the channel bonding configuration is based on a first frequency segment within a first frequency band and a second frequency segment within a second frequency band, and transmit to an AP or receive a transmission from the AP using the first frequency segment and the second frequency segment based on the identified channel bonding configuration.

Another apparatus for wireless communication at a wireless STA is described. The apparatus may include means for receiving a management frame including an operation information field, identifying a channel bonding configuration based on the operation information field, where the channel bonding configuration is based on a first frequency segment within a first frequency band and a second frequency segment within a second frequency band, and transmitting to an AP or receiving a transmission from the AP using the first frequency segment and the second frequency segment based on the identified channel bonding configuration.

A non-transitory computer-readable medium storing code for wireless communication at a wireless STA is described. The code may include instructions executable by a processor to receive a management frame including an operation information field, identify a channel bonding configuration based on the operation information field, where the channel bonding configuration is based on a first frequency segment within a first frequency band and a second frequency segment within a second frequency band, and transmit to an AP or receive a transmission from the AP using the first frequency segment and the second frequency segment based on the identified channel bonding configuration.

Some examples of the method, apparatuses, and non-transitory computer-readable medium described herein may further include operations, features, means, or instructions for identifying a first spectral mask associated with the first frequency segment, identifying a second spectral mask associated with the second frequency segment and transmitting to the AP using the first frequency segment and the second frequency segment based on the identified first and second spectral masks. In some examples of the method, apparatuses, and non-transitory computer-readable medium described herein, the first and second spectral masks each include an 80 MHz spectral mask.

Some examples of the method, apparatuses, and non-transitory computer-readable medium described herein may further include operations, features, means, or instructions for transmitting a capabilities element indicating whether the wireless STA supports a channel bonding configuration with the first frequency band and the second frequency band in different frequency bands.

In some examples of the method, apparatuses, and non-transitory computer-readable medium described herein, the capabilities element further indicates whether the wireless STA supports reception of PPDUs with preamble puncturing, whether the wireless STA supports transmission of PPDUs with preamble puncturing, whether the wireless STA supports operation as a beamformer in puncture sounding procedures, whether the wireless STA supports operation as a beamformee in puncture sounding procedures, or some combination thereof.

In some examples of the method, apparatuses, and non-transitory computer-readable medium described herein, the management frame further includes an indication of whether the first frequency band and the second frequency band may be in a same frequency band.

In some examples of the method, apparatuses, and non-transitory computer-readable medium described herein, the first frequency band includes a 5 GHz band and the second frequency band includes a 6 GHz band. In some examples of the method, apparatuses, and non-transitory computer-readable medium described herein, the first frequency segment includes an 80 MHz bandwidth, and the second frequency segment includes an 80 MHz bandwidth.

A method of wireless communication at an AP is described. The method may include transmitting a management frame including a first operation information field indicating a first channel width within a first frequency band, a second operation information field indicating a second channel width within one or both of the first frequency band or a second frequency band and a puncturing scheme for the second channel width and transmitting to a wireless STA or receiving a transmission from the wireless STA using the second channel width based on the puncturing scheme.

An apparatus for wireless communication at an AP is described. The apparatus may include a processor, memory in electronic communication with the processor, and instructions stored in the memory. The instructions may be executable by the processor to cause the apparatus to transmit a management frame including a first operation information field indicating a first channel width within a first frequency band, a second operation information field indicating a second channel width within one or both of the first frequency band or a second frequency band and a puncturing scheme for the second channel width and transmit to a wireless STA or receive a transmission from the wireless STA using the second channel width based on the puncturing scheme.

Another apparatus for wireless communication at an AP is described. The apparatus may include means for transmitting a management frame including a first operation information field indicating a first channel width within a first frequency band, a second operation information field indicating a second channel width within one or both of the first frequency band or a second frequency band and a puncturing scheme for the second channel width and transmitting to a wireless STA or receiving a transmission from the wireless STA using the second channel width based on the puncturing scheme.

A non-transitory computer-readable medium storing code for wireless communication at an AP is described. The code may include instructions executable by a processor to transmit a management frame including a first operation information field indicating a first channel width within a first frequency band, a second operation information field indicating a second channel width within one or both of the first frequency band or a second frequency band and a puncturing scheme for the second channel width and transmit to a wireless STA or receive a transmission from the wireless STA using the second channel width based on the puncturing scheme.

Some examples of the method, apparatuses, and non-transitory computer-readable medium described herein may further include operations, features, means, or instructions for identifying one or more incumbent occupied bandwidths associated with one or more of the first frequency band or the second frequency band. Some examples of the method, apparatuses, and non-transitory computer-readable medium described herein may further include operations, features, means, or instructions for determining a puncture status for each resource unit associated with the second channel width based on the one or more incumbent occupied bandwidths. In some examples of the method, apparatuses, and non-transitory computer-readable medium described herein, the puncturing scheme may be based on the puncture status for each resource unit associated with the second channel width. Some examples of the method, apparatuses, and non-transitory computer-readable medium described herein may further include operations, features, means, or instructions for determining an eight bit bitmap based on the determined puncture status for each resource unit associated with the second channel width, where the indicated puncturing scheme includes the eight bit bitmap.

Some examples of the method, apparatuses, and non-transitory computer-readable medium described herein may further include operations, features, means, or instructions for determining a puncture status for each physical channel within the second channel width based on the one or more incumbent occupied bandwidths. In some examples of the method, apparatuses, and non-transitory computer-readable medium described herein, the puncturing scheme may be based on the puncture status for each physical channel within the second channel width. Some examples of the method, apparatuses, and non-transitory computer-readable medium described herein may further include operations, features, means, or instructions for determining an eight bit bitmap based on the determined puncture status for each physical channel within the second channel width, where the indicated puncturing scheme includes the eight bit bitmap.

In some examples of the method, apparatuses, and non-transitory computer-readable medium described herein, the second channel width includes 160 MHz and each physical channel within the second channel width includes a 20 MHz channel.

In some examples of the method, apparatuses, and non-transitory computer-readable medium described herein, the first channel width indicated by the first operation information field may be based on the puncturing scheme.

Some examples of the method, apparatuses, and non-transitory computer-readable medium described herein may further include operations, features, means, or instructions for determining the first channel width associated with the first frequency band and the second channel width associated with one or both of the first frequency band or the second frequency band, determining a first channel center frequency associated with the second channel width and determining a second channel center frequency associated with the second channel width.

In some examples of the method, apparatuses, and non-transitory computer-readable medium described herein, the second operation information field indicates the determined second channel width, the determined first channel center frequency, and the determined second channel center frequency. In some examples of the method, apparatuses, and non-transitory computer-readable medium described herein, the first operation information field indicates the determined first channel center frequency and the first channel width. In some examples of the method, apparatuses, and non-transitory computer-readable medium described herein, the first frequency band includes a 5 GHz band and the second frequency band includes a 6 GHz band.

A method of wireless communication at an AP is described. The method may include selecting a channel bonding configuration based on a first frequency segment within a first frequency band and a second frequency segment within a second frequency band, transmitting a management frame including an operation information field indicating the selected channel bonding configuration, and transmitting to a wireless STA or receiving a transmission from the wireless STA using the first frequency segment and the second frequency segment based on the selected channel bonding configuration.

An apparatus for wireless communication at an AP is described. The apparatus may include a processor, memory in electronic communication with the processor, and instructions stored in the memory. The instructions may be executable by the processor to cause the apparatus to select a channel bonding configuration based on a first frequency segment within a first frequency band and a second frequency segment within a second frequency band, transmit a management frame including an operation information field indicating the selected channel bonding configuration, and transmit to a wireless STA or receive a transmission from the wireless STA using the first frequency segment and the second frequency segment based on the selected channel bonding configuration.

Another apparatus for wireless communication at an AP is described. The apparatus may include means for selecting a channel bonding configuration based on a first frequency segment within a first frequency band and a second frequency segment within a second frequency band, transmitting a management frame including an operation information field indicating the selected channel bonding configuration, and transmitting to a wireless STA or receiving a transmission from the wireless STA using the first frequency segment and the second frequency segment based on the selected channel bonding configuration.

A non-transitory computer-readable medium storing code for wireless communication at an AP is described. The code may include instructions executable by a processor to select a channel bonding configuration based on a first frequency segment within a first frequency band and a second frequency segment within a second frequency band, transmit a management frame including an operation information field indicating the selected channel bonding configuration, and transmit to a wireless STA or receive a transmission from the wireless STA using the first frequency segment and the second frequency segment based on the selected channel bonding configuration.

Some examples of the method, apparatuses, and non-transitory computer-readable medium described herein may further include operations, features, means, or instructions for identifying a first spectral mask associated with the first frequency segment, identifying a second spectral mask associated with the second frequency segment and transmitting to the wireless STA using the first frequency segment and the second frequency segment based on the identified first and second spectral masks. In some examples of the method, apparatuses, and non-transitory computer-readable medium described herein, the first and second spectral masks each include an 80 MHz spectral mask.

Some examples of the method, apparatuses, and non-transitory computer-readable medium described herein may further include operations, features, means, or instructions for receiving a capabilities element indicating whether the wireless STA supports a channel bonding configuration with the first frequency band and the second frequency band in different frequency bands.

In some examples of the method, apparatuses, and non-transitory computer-readable medium described herein, the capabilities element further indicates whether the wireless STA supports reception of PPDUs with preamble puncturing, whether the wireless STA supports transmission of PPDUs with preamble puncturing, whether the wireless STA supports operation as a beamformer in puncture sounding procedures, whether the wireless STA supports operation as a beamformee in puncture sounding procedures, or some combination thereof.

In some examples of the method, apparatuses, and non-transitory computer-readable medium described herein, the first frequency band includes a 5 GHz band and the second frequency band includes a 6 GHz band. In some examples of the method, apparatuses, and non-transitory computer-readable medium described herein, the first frequency segment includes an 80 MHz bandwidth, and the second frequency segment includes an 80 MHz bandwidth. In some examples of the method, apparatuses, and non-transitory computer-readable medium described herein, the management frame further includes an indication of whether the first frequency band and the first frequency band may be in a same frequency band.

DETAILED DESCRIPTION

Figure 1:
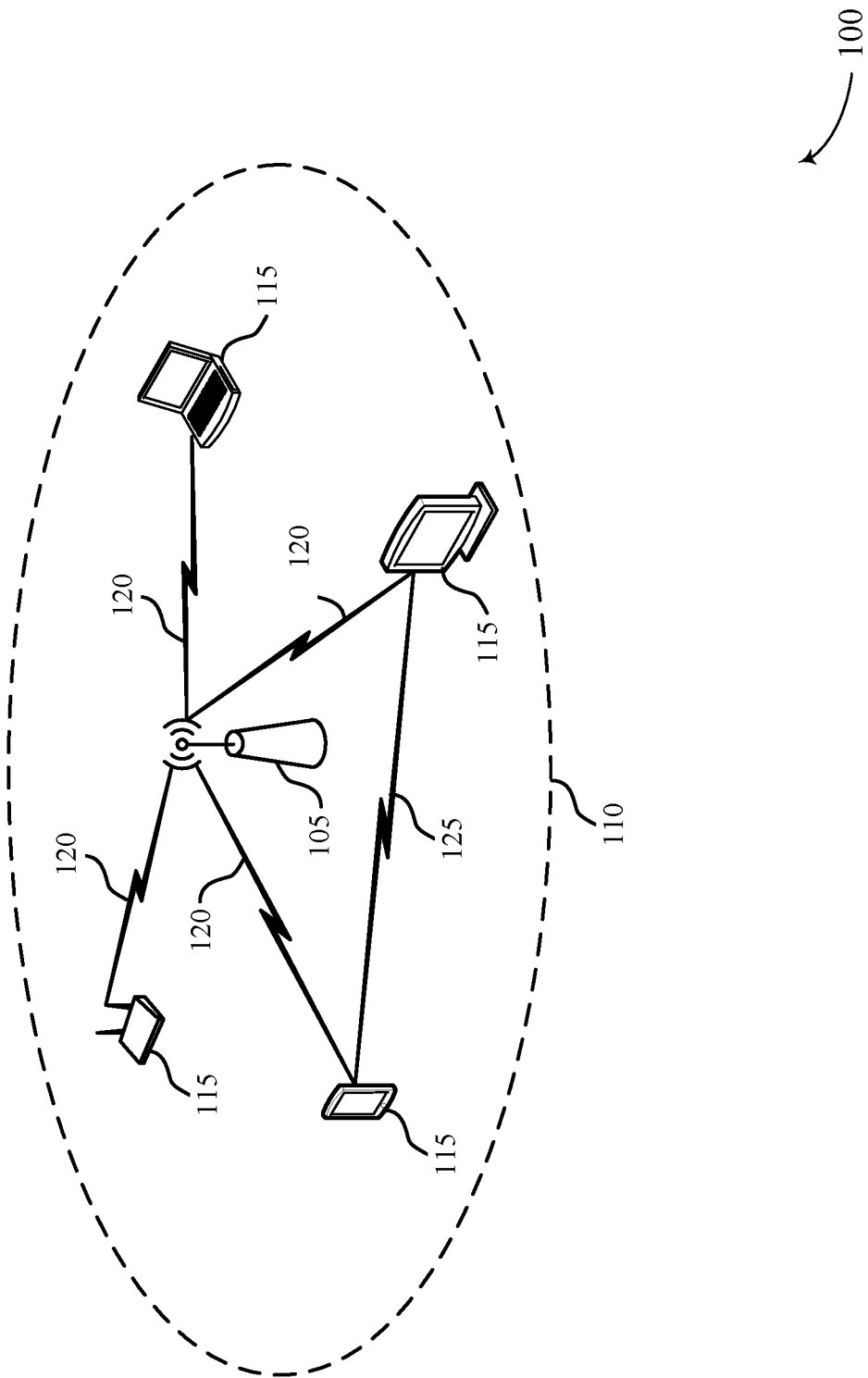
FIG. 1 illustrates an example of a wireless communications system that supports dual band channel bonding and puncturing in accordance with aspects of the present disclosure.

An access point (AP) may support one or more basic service sets (BSSs) and may periodically broadcast frames (e.g., broadcast frames, beacons, control frames, management frames, etc.) to enable any wireless STAs (STAs) within wireless range of the AP to establish (or maintain) a communication link with the AP. Devices in a wireless local area network (WLAN) (e.g., APs and STAs) may communicate over a channel width or BSS bandwidth supported by the BSS within frequency bands such as the 5 GHz band, the 3.6 GHz band, the 2.4 GHz band, etc. Some wireless communications systems may also support operation using other frequency bands (e.g., such as the 6 GHz band). Some wireless devices (e.g., a first class of STAs) may be incapable of certain communications techniques (e.g., such as dual band channel bonding, physical channel or resource unit (RU) puncturing, etc.), while other wireless devices (e.g., a second class of STAs) may be capable of such techniques. As discussed below, wireless communications systems may support dual band channel bonding and puncturing of communications while maintaining backwards compatibility.

As wireless communications systems include additional bands for communications (e.g., the 6 GHz band) it may be desirable to use such additional bands along with other contiguous bands (e.g., such as the 5 GHz band). However, some bandwidths within these bands may be occupied by incumbents (e.g., such as radars in the 5 GHz band, radars in the 6 GHz band, etc.). Each band may contain multiple channels (e.g., each spanning 20 MHz in frequency, 40 MHz in frequency, 80 MHz in frequency, etc.), some of which may be usable by an AP or STA, while others may include bandwidth occupied by incumbents. To efficiently use available resources, while avoiding bandwidths occupied by incumbents, wireless communications system may support dual band channel bonding techniques, channel or RU puncturing schemes, etc. That is, an AP may indicate (e.g., via BSS signaling or management frame broadcasting) a channel width (e.g., a BSS bandwidth) as well as, in some cases, segment center frequencies, indications of dual band channel bonding, puncturing schemes, etc. according to the techniques described in more detail below.

Additionally, wireless communications systems may maintain backwards compatibility by indicating a separate channel width or a separate BSS bandwidth for a first class of STAs (e.g., legacy STAs), as the first class of STAs may not understand or be capable of dual channel bonding configurations, bandwidth indications that include puncturing, etc. That is, BSS bandwidth or channel width may be broadcast for different classes or generations of served clients (e.g., for very high throughput (VHT) clients, high efficiency (HE) clients, extremely high throughput (EHT) etc.). That is, an AP may signal (e.g., broadcast) management frames or beacons that may include a first channel width for a first class of STAs (e.g., VHT STAs or HE generation-1 STAs incapable of dual channel bonding, STAs incapable of channel or RU puncturing, etc.) as well as a second channel width, and in some cases a puncturing scheme associated with the second channel width, for a second class of STAs (e.g., HE generation-2 STAs, EHT STAs, or other STAs capable of dual channel bonding, STAs capable of channel or RU puncturing, etc.). Therefore, a first class of stations (e.g., VHT STAs or HE generation-1 STAs) may identify the first channel width from the management frame (e.g., from a first operation information field), and may communicate with the AP accordingly, while the second class of stations (e.g., HE generation-2 STAs or EHT STAs) may identify the second channel width, the dual band channel bonding configuration, the puncturing scheme etc. from the management frame (e.g., from a second operation information field), and may communicate with the AP accordingly.

With the advent or inclusion of new bands for communications (e.g., the 6 GHz band) it may be beneficial for wireless communications systems to employ dual band channel bonding. For example, wireless communications system may support 80 MHz+80 MHz physical layer convergence procedure (PLCP) protocol data unit (PPDU) transmissions (e.g., 160 MHz transmission) with each 80 MHz segment in a different frequency band (e.g., which may be referred to as dual channel bonding). In some cases, dual channel bonding may be implemented in the 5 GHz band and the 6 GHz band. Signaling for such a combination or configuration of transmission (e.g., dual band channel bonding capability signaling, dual band channel bonding transmissions, etc.) may be implemented according to the techniques described below. Backward compatible signaling for a first segment (e.g., segment 0) and a second segment (e.g., segment 1) along with BSS bandwidth or channel width is also described.

Aspects of the disclosure are initially described in the context of a wireless communications system. Examples of operation element formats, operation information fields, spectral masking for dual band channel bonding, and process flows implementing the described techniques are then discussed. Aspects of the disclosure are further illustrated by and described with reference to apparatus diagrams, system diagrams, and flowcharts that relate to dual band channel bonding and puncturing FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile STAs, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a BSS or an ESS. The various STAs 115 in the network are able to communicate with one another through the AP 105. Also shown is a coverage area 110 of the AP 105, which may represent a BSA of the WLAN 100. An extended network STA (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 (e.g., or a virtual AP (VAP)) and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links may include Wi-Fi Direct connections, Wi-Fi Tunneled Direct Link Setup (TDLS) links, and other group connections. STAs 115 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11be, etc. In other implementations, peer-to-peer connections or ad hoc networks may be implemented within WLAN 100. Devices in WLAN 100 may communicate over unlicensed spectrum, which may be a portion of spectrum that includes frequency bands traditionally used by Wi-Fi technology, such as the 6 GHz band, the 5 GHz band, the 2.4 GHz band, the 60 GHz band, the 3.6 GHz band, and/or the 900 MHz band. The unlicensed spectrum may also include other frequency bands.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

WLAN 100 may be formed by a plurality of APs 105 that operate according to the IEEE 802.11 family of standards (e.g., or according to other suitable wireless protocols). Thus, although only one AP 105 is shown in WLAN 100 for simplicity, it is to be understood that WLAN 100 may be formed by any suitable number of APs 105. Each AP 105 may be assigned a unique MAC address (e.g., which may be programmed by a manufacturer of the AP 105). Similarly, each STA 115 may be assigned a unique MAC address. In some cases, AP 105 may assign an association identifier (AID) to each STA 115 (e.g., so that AP 105 may identify the STAs 115 using the assigned AID values).

In some examples, WLAN 100 may allow for multiple-input, multiple-output (MIMO) communications between AP 105 and one or more STAs 115. The MIMO communications may include single-user MIMO (SU-MIMO) between a single STA 115 and AP 105 and multi-user MIMO (MU-MIMO) communications between multiple STAs 115 and AP 105. In some cases, WLAN 100 may utilize a multiple access mechanism such as orthogonal frequency division multiple access (OFDMA).

In accordance with the described techniques, AP 105 may support communications for a given BSS (e.g., associated with a particular VAP) over one (or more) channels, where each channel refers to a portion of a radio frequency spectrum (e.g., a 20 MHz portion, a 40 MHz portion, a 160 MHz portion, etc.) of a total frequency bandwidth used by the AP to communicate in the BSS. AP 105 may in some cases support multiple BSSs at the same time, and these BSSs may in some cases share channels with each other or with BSSs of another AP 105. Each BSS may be associated with a given primary channel of the total bandwidth (e.g., over which AP 105 transmits beacon information or other important control information to STAs 115 associated with the BSS).

According to aspects of the present disclosure, APs 105 may signal management frames that include a first and second operation information field (e.g., in an element of the management frame, such as an operation element) indicating two channel widths for different classes of STAs 115. STAs 115 may identify the first or second operation information field based on capabilities of the STA 115 (e.g., whether or not the STA 115 is capable of dual band channel bonding, resource unit or physical channel puncturing, etc.). In some cases, the second operation information field may indicate a second channel width within a first and second frequency band (e.g., within the 5 GHz band and the 6 GHz band), as well as a puncturing scheme associated with the second channel width. In some cases, the second operation information field may indicate a dual band channel bonding configuration, where two frequency segments associated with the channel bonding configuration are in two different frequency bands (e.g., a channel bonding configuration with segment 0 within the 5 GHz band and segment 1 within the 6 GHz band). In some cases, a tightened spectral mask may be used for such dual band channel bonding configurations.

Particular implementations of the subject matter described in this disclosure can be implemented to realize one or more of the following potential advantages. In some implementations, the described techniques can be used as a method for wireless communication at a wireless STA which may receive a management frame including a first operation information field indicating a first channel width within a first frequency band, a second operation information field indicating a second channel width within one or both of the first frequency band or a second frequency band and a puncturing scheme for the second channel width and transmit to an AP or receive a transmission from the AP using the second channel width based at least in part on the puncturing scheme. An advantage of this method may include efficiently using available resources while avoiding occupied bandwidths, for example by continuing to use at least some unoccupied channels within one or both of the frequency bands when one or more of the channels are occupied.

One example of an advantage of a STA determining a puncture status for each resource unit associated with the second channel width based at least in part on the indicated puncturing scheme and determining a puncture status for each physical channel within the second channel width based at least in part on the indicated puncturing scheme, is that bandwidths occupied by incumbents operating in those channels, for example such as radars using the 5 and 6 GHz bands, may be avoided and the usable bandwidth for communicating devices may be increased. One example of an advantage of a STA determining, based at least in part on the second operation information field, a first channel center frequency associated with the second channel width and a second channel center frequency associated with the second channel width and transmitting to the AP or receiving the transmission from the AP is based at least in part on the second channel width, the determined first channel center frequency, and the determined second channel center frequency, is that channel utilization may be improved via puncturing schemes, and as well as backwards compatibility considerations.

In some implementations, the described techniques can be used as a method for wireless communication at a wireless STA, which may receive a management frame including an operation information field, identify a channel bonding configuration based at least in part on the operation information field, where the channel bonding configuration is based at least in part on a first frequency segment within a first frequency band and a second frequency segment within a second frequency band, and transmit to an AP or receiving a transmission from the AP using the first frequency segment and the second frequency segment based at least in part on the identified channel bonding configuration. An advantage of this method may be increased data throughput through the efficient use of a greater amount of frequency resources.

One example of an advantage of a STA identifying a first spectral mask associated with the first frequency segment, identifying a second spectral mask associated with the second frequency segment, and transmitting to the AP using the first frequency segment and the second frequency segment based at least in part on the identified first and second spectral masks, may be providing a spectral mask for 80+80 MHz PPDU to avoid signal leakage.

Another example of an advantage of a STA transmitting a capabilities element indicating whether the wireless STA supports a channel bonding configuration with the first frequency band and the second frequency band in different frequency bands, where the management frame further includes an indication of whether the first frequency band and the second frequency band are in a same frequency band, may provide tightening of the spectral mask for 80+80 MHz PPDU to avoid signal leakage and to efficiently use available resources, while avoiding bandwidths occupied by incumbents, by the wireless communications systems which may support dual band channel bonding techniques, channel or RU puncturing schemes.

Figure 2:
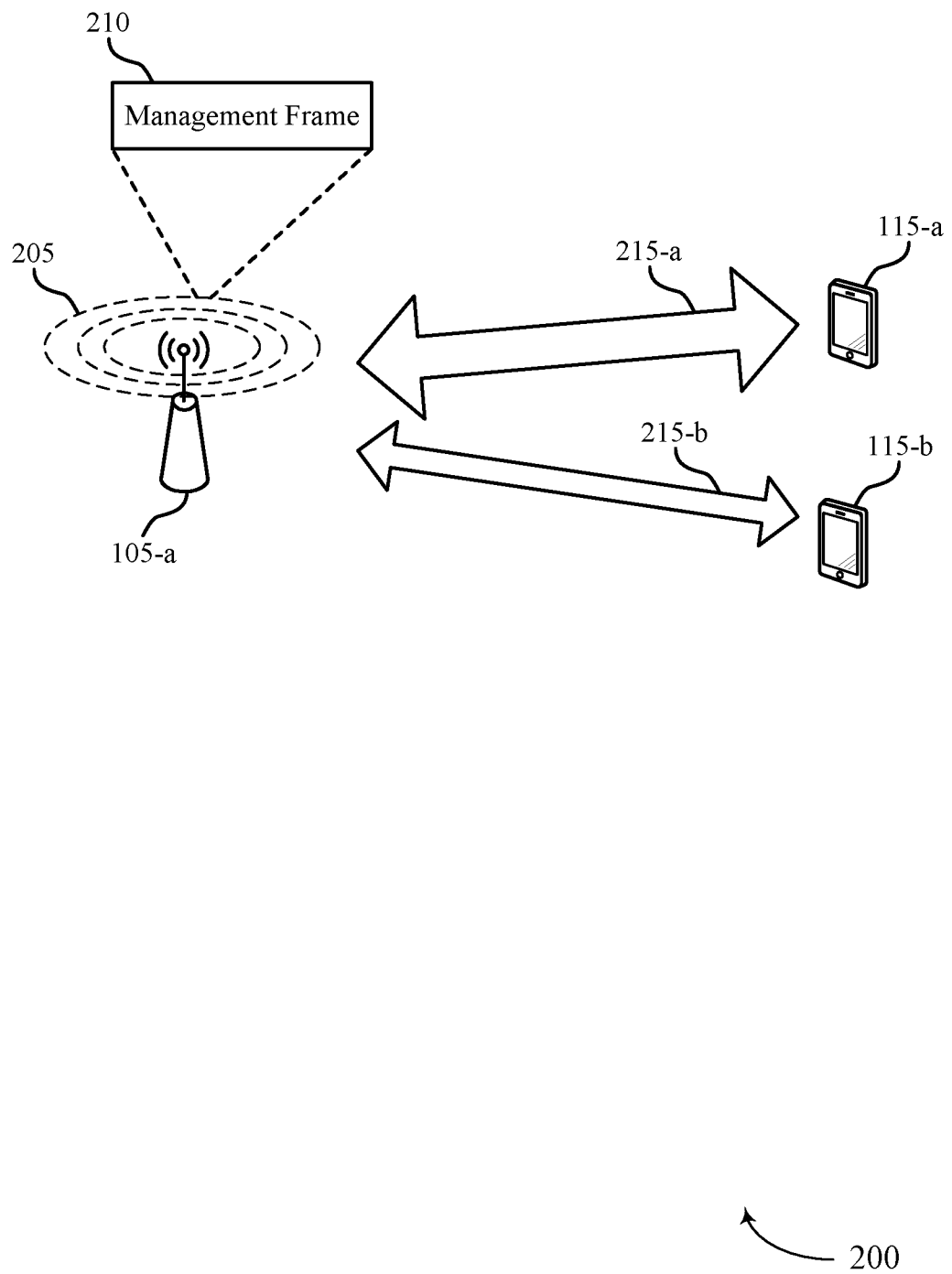
FIG. 2 illustrates an example of a wireless communications system that supports dual band channel bonding and puncturing in accordance with aspects of the present disclosure.

FIG. 2 illustrates an example of a wireless communications system 200 that supports dual band channel bonding and puncturing in accordance with aspects of the present disclosure. In some examples, wireless communications system 200 may implement aspects of WLAN 100. A wireless connection between AP 105-*a* and STA 115-*a* may be referred to as a link 215 or a communication link, and each link 215 may include one or more channels. As an example, wireless communications system 200 may support communications such that AP 105-*a* and STA 115-*a* may communicate over one or more channels via link 215-*a* while AP 105-*a* and STA 115-*b* communicate over one or more channels via link 215-*b*.

In the present example, AP 105-*a* may transmit management frames 210 (e.g., which in some cases may refer to a broadcast frame, a beacons, a control frame, etc.) via signaling 205. Signaling 205 may refer to a broadcast transmission, a groupcast transmission, etc. According to the techniques described below, management frames 210 may indicate a first channel width (e.g., a first BSS bandwidth) to a first class of wireless devices (e.g., wireless devices incompatible with HE operation information, wireless devices incapable of dual band channel bonding and puncturing, etc.), and may indicate a second channel width (e.g., a second BSS bandwidth) to a second class of wireless devices (e.g., wireless devices compatible with HE operation information, wireless devices capable of dual band channel bonding and puncturing, etc.). Accordingly, AP 105-*a* and STA 115-*a* (e.g., a wireless device of the second class described above) may communicate over one or more channels according to a first channel width, as indicated or established by the management frame 210, via link 215-*a*. Further, AP 105-*a* and STA 115-*b* (e.g., a wireless device of the first class described above) may communicate over one or more channels according to a second channel width (e.g., and in some cases a puncturing scheme associated with the second channel width), as indicated or established by the management frame 210, via link 215-*b*.

The first class of STAs 115 (e.g., STA 115-b) may, in some cases, be referred to as legacy devices, 802.11ac devices, VHT devices, VHT STAs, 802.11ax generation-1 devices, HE generation-1 devices, HE generation-1 STAs, etc. The second class of STAs 115 (e.g., STA 115-a) may, in some cases, be referred to 802.11ax generation-2 devices, HE generation-2 devices, HE generation-2 STAs, 802.11be devices, EHT devices, EHT STAs, and beyond. Techniques described herein provide for coexistence between the first and second classes of STAs (e.g., wireless communications system 200 may support both STA 115-a and STA 115-b). The signaling and indications described may provide for implementation of dual band channel bonding and/or puncturing techniques by STA 115-a and AP 105-a, while still providing coexistence with STA 115-b. To achieve such, management frames may establish channel widths (e.g., BSS bandwidths) for each class of STAs (e.g., for STA 115-a and STA 115-b) via operation information fields, as further described below with reference to FIG. 3.

Figure 3:
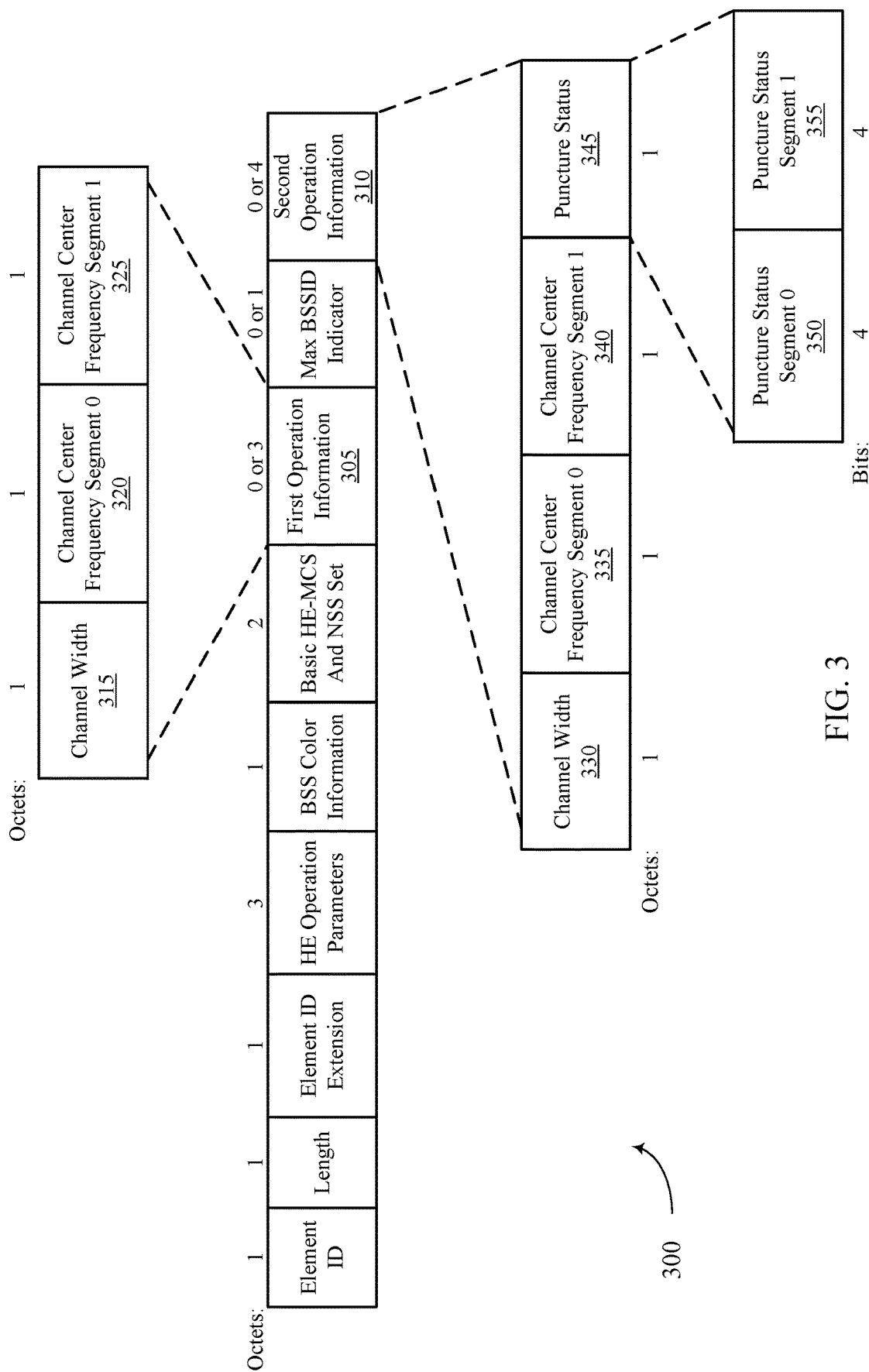
FIG. 3 illustrates an example of an operation element format that supports dual band channel bonding and puncturing in accordance with aspects of the present disclosure.

FIG. 3 illustrates an example of an operation element format 300 that supports dual band channel bonding and puncturing in accordance with aspects of the present disclosure. In some examples, operation element format 300 may implement aspects of WLAN 100 and wireless communications system 200. In some cases, operation element format 300 may be used by an AP 105 to indicate different channel widths (e.g., different BSS bandwidths) to different classes of wireless devices (e.g., for improved channel utilization via puncturing schemes, as well as backwards compatibility considerations). Operation element format 300 may include several fields or subfields including various information. For example, operation element format 300 may include at least a first operation information field 305 (e.g., a VHT operation information field) and a second operation information field 310 (e.g., an HE operation information field or an EHT operation information field). In some examples, the first operation field 305 may be a VHT operation information field and the second operation information field 310 may be an HE operation information field or an EHT operation information field. Other fields present in an operation element format 300 may include, for example, an element ID field, a length field, an element ID extension field, an operation parameters field (e.g., an HE operation parameters field or an EHT operation parameters field), a BSS color information field, a basic MCS and NSS set field (e.g., a basic HE-MCS and NSS set field or a basic EHT-MCS and NSS set field), a max BSSID indicator field, etc.

Operation element format 300 may illustrate an example format of an operation element distributed (e.g., signaled or broadcast) by an AP in a basic operation set (e.g., to establish or maintain a BSS). The AP may signal an operation element (e.g., according to example operation element format 300 within, for example, a management frame) to indicate channel widths, segment frequency centers, puncturing schemes, etc. to clients of both the first and second class or generation.

For example, the first class of STAs (e.g., VHT STAs or HE generation-1 STAs such as STA 115-b as described with reference to FIG. 2) may not understand the second operation information 310, and may determine channel width information, segment center frequencies, etc., via the first operation information field 305 (e.g., which may be referred to as a VHT operation information field). The first class of STAs may determine channel width information from the channel width subfield 315, a first segment (e.g., segment 0) center frequency from channel center frequency segment 0 subfield 320, and a second segment (e.g., segment 1) center frequency from channel center frequency segment 1 subfield 325. Additionally, the first class of STAs may communicate with the AP according to the identified BSS parameters.

The second class of STAs (e.g., HE generation-2 STAs or EHT STAs such as STA 115-a as described with reference to FIG. 2) may determine channel width information, segment center frequencies, dual band channel bonding indications, puncturing schemes, etc. via the second operation information field 310 (e.g., which may be referred to as an HE operation information field or an EHT operation information field). The second class of STAs may determine channel width information from the channel width subfield 330, a first segment (e.g., segment 0) center frequency from channel center frequency segment 0 subfield 335, and a second segment (e.g., segment 1) center frequency from channel center frequency segment 1 subfield 340, and a puncturing scheme from Puncture status subfield 345.

Channel width subfield 315 (e.g., interpreted by the first class of STAs) and channel width subfield 330 (e.g., interpreted by the second class of STAs) may (e.g., along with the high throughput (HT) Operation element STA Channel Width field) define the respective BSS bandwidth (e.g., the channel width) for the first and second classes of STAs. Channel width subfield 315 and channel width subfield 330 may each include, for example, 1 octet. Channel width subfield 315 and channel width subfield 330 may be set to 0 for 20 MHz or 40 MHz BSS bandwidth; may be set to 1 for 80 MHz, 160 MHz or 80+80 MHz BSS bandwidth; may be set to 2 for 160 MHz BSS bandwidth (deprecated); may be set to 3 for non-contiguous 80+80 MHz BSS bandwidth (deprecated); and values in the range of 4 to 255 may be reserved.

In some examples, channel center frequency segment 0 subfield 320 and channel center frequency segment 1 subfield 325 may define a channel center frequency for 160/80+80 BSS bandwidth for the first class of STAs (e.g., legacy STAs, VHT STAs, or HE generation-1 STAs). Channel center frequency segment 0 subfield 335 and channel center frequency segment 1 subfield 340 may define a channel center frequency for the 160/80+80 MHz BSS bandwidth for the second class of STAs (e.g., HE generation-2 STAs or EHT STAs).

Puncture status subfield 345 may include puncture status segment 0 subfield 350 and puncture status segment 1 subfield 355. Bits of puncture status segment 0 subfield 350 and puncture status segment 1 subfield 355 may be set (e.g., by an AP) to indicate puncturing of certain channels or RUs within a channel width indicated by the channel width subfield 330, as illustrated, for example, by Table 3.1.

TABLE 3.1

| Subfield | Definition | Encoding |
|---|---|---|
| Puncture Status Segment 0 | Indicates puncture status of a 242 RU in 996RU in the 80 MHz channel segment that contains the primary channel | B0: puncture status of RU 1 [−500: −259]<br>B1: puncture status of RU 2 [−258: −17]<br>B2: puncture status of RU 3 [17: 258]<br>B3: puncture status of RU 4 [259: 500]<br>Set to 0: not puncture<br>Set to 1: puncture |
| Puncture Status Segment 1 | Indicates puncture status of a 242 RU in 996 RU in the secondary 80 MHz channel of the BSS | B4: puncture status of RU 1 [−500: −259]<br>B5: puncture status of RU 2 [−258: −17]<br>B6: puncture status of RU 3 [17: 258]<br>B7: puncture status of RU 4 |

TABLE 3.1-continued

| Subfield | Definition | Encoding |
| --- | --- | --- |
| | | [259: 500] Note: Puncture Pattern Segment 1 is reserved if BSS BW not equal to 160/80 + 80 MHz |

Example Table 3.1 illustrates how bits within puncture status subfield 345 may be used to indicate a puncture status for RUs associated with a channel width (e.g., a second channel width, which may be indicated by channel width subfield 330). In other examples, puncturing schemes may indicate puncturing scheme for physical channels associated with a channel width. In such cases, bits B0-B7 may be used, for example, to indicate puncture status for each 20 MHz channel within a 160/80+80 MHz channel width (e.g., where the physical 20 MHz channels are arranged in increasing order of frequency.

In some cases, puncturing schemes may be implemented in scenarios where the channel width is 80 MHz or greater. In cases where the channel width is less than 80 MHz, the puncture status subfield 345 may be reserved (e.g., the puncture status subfield 345 may be a reserved subfield if the channel width subfield 330 indicates a channel width of less than 80 MHz). According to the example Table 3.1, bits of puncture status subfield 345 may be set in order to, for example, puncture channels or RUs of a channel width associated with incumbent occupied bandwidth.

Figure 4:
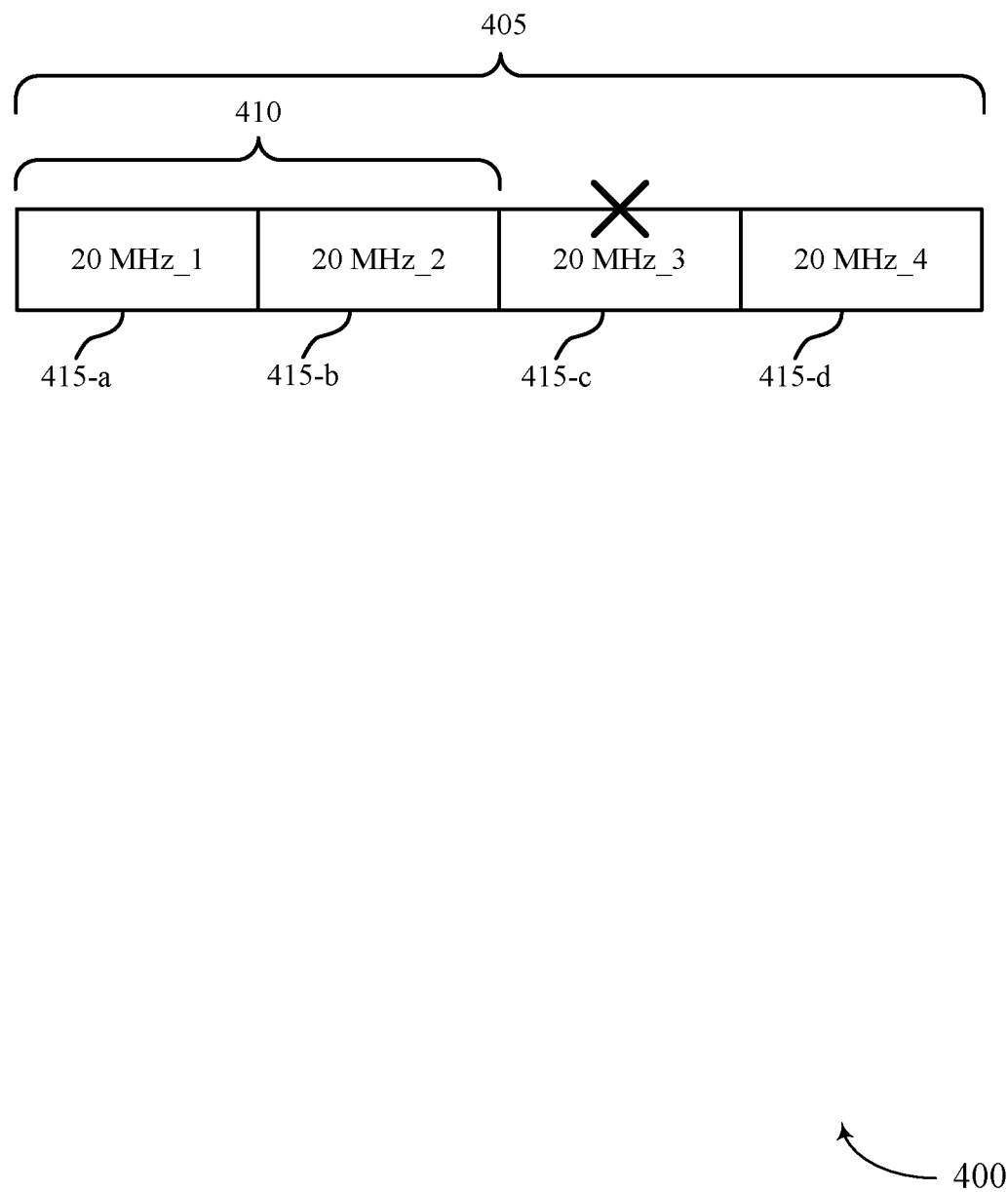
FIG. 4 illustrates an example of a channel width diagram that supports dual band channel bonding and puncturing in accordance with aspects of the present disclosure.

FIG. 4 illustrates an example of a channel width diagram 400 that supports puncturing in accordance with aspects of the present disclosure. In some examples, channel width diagram 400 may implement aspects of WLAN 100 and wireless communications system 200. Channel width diagram 400 may illustrate the different channel widths that may be indicated by an AP 105 (e.g., via management frames and techniques described herein). For example, different operation information fields (e.g., such as a first operation information field and a second operation information field) may indicate different channel widths (e.g., BSS bandwidths including different frequency segments 415), such as both channel width 405 and channel width 410.

Frequency segments 415 may refer to a channel (e.g., such as a 20 MHz channel) or may refer to a RU (e.g., such as a 242 tone RU). In the present example, frequency segment 415-c may be punctured (e.g., as bandwidth within or bandwidth overlapping with a portion of frequency segment 415-c may be occupied by an incumbent or radar). Transmissions over channel width 405 may be referred to as a punctured transmission (e.g., where the transmission waveform is zeroed out over frequency segment 415-c, where bits are not placed on the subcarriers associated with frequency segment 415-c, etc.). For example, in cases where frequency segment 415-c is to be punctured (e.g., when bandwidth associated with frequency segment 415-c is occupied by radar), an AP may indicate channel width 405 with RU 3 puncturing to a second class of STAs (e.g., HE generation-2 or EHT STAs), as well as channel width 410 to a first class of STAs (e.g., HE generation-1 or VHT STAs) (e.g., as generation-1 STAs may not be capable of communications with punctured bandwidth). For example, a first operation information field (e.g., a VHT operation information field) may indicate a channel width of 40 MHz, and a second operation information field (e.g., an HE or EHT operation information field) may indicate a channel width of 80 MHz and may further indicate that RU 3 is punctured (e.g., in a puncture status segment 0 subfield).

Figure 5:
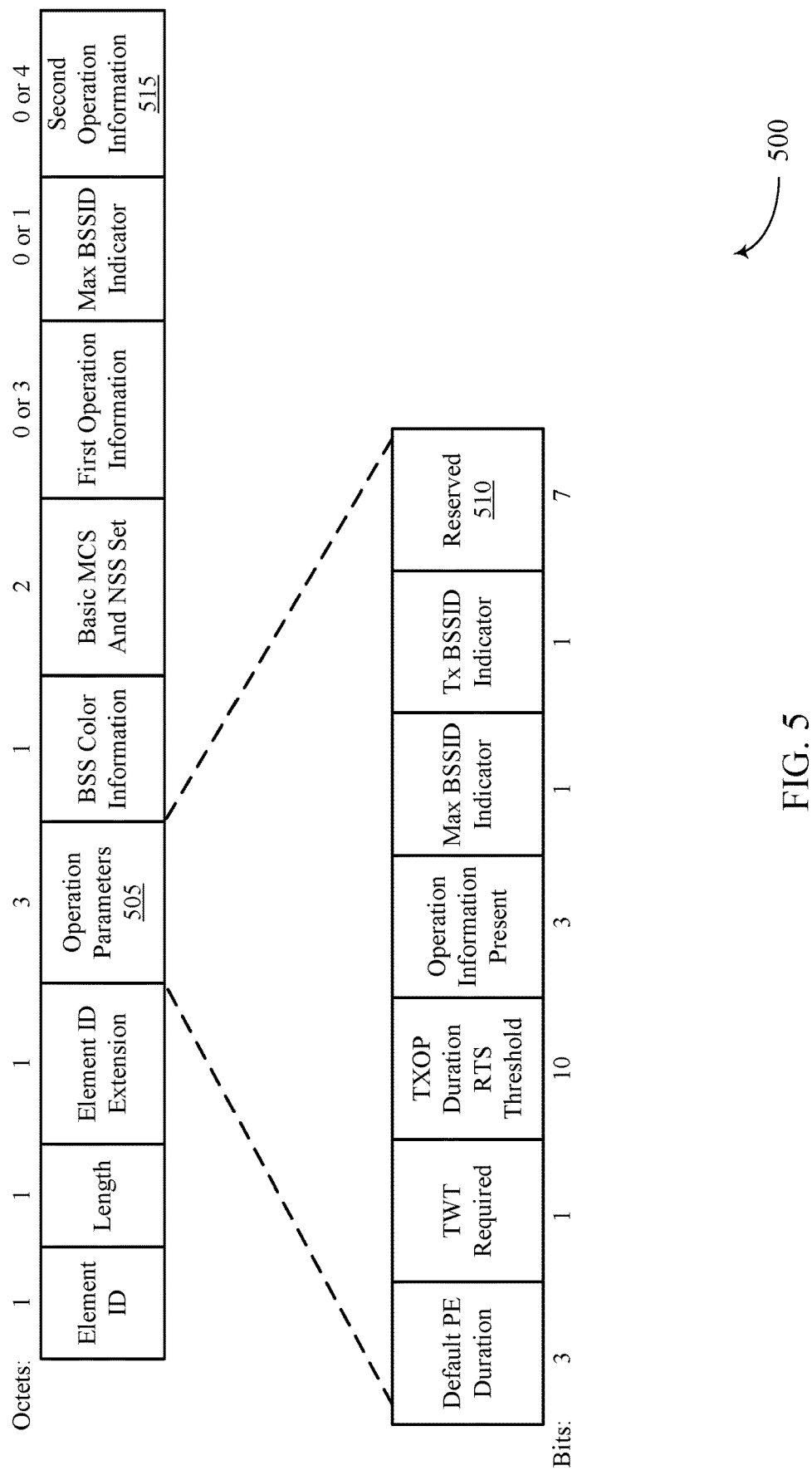
FIG. 5 illustrates an example of an operation element format that supports dual band channel bonding and puncturing in accordance with aspects of the present disclosure.

FIG. 5 illustrates an example of an operation element format 500 that supports dual band channel bonding and puncturing in accordance with aspects of the present disclosure. In some examples, operation element format 500 may implement aspects of WLAN 100 and wireless communications system 200. In some cases, operation element format 500 may be used by an AP 105 to indicate dual band channel bonding (e.g., channel bonding where segment channel center frequencies are in different frequency bands). Operation element format 500 may include several fields or subfields including various information. For example, operation element format 500 may include at least an Operation Parameters field 505 (e.g., an HE Operations Parameters Field or an EHT Operations Parameters field). Other fields present in an operation element format 500 may include, for example, an element ID field, a length field, an element ID extension field, a BSS color information field, a basic MCS and NSS set field (e.g., a basic HE-MCS and NSS set field or a basic EHT-MCS and NSS set field), a first operation information field (e.g., a VHT operation information field as described with reference to FIG. 3), a max BSSID indicator field, a second operation information field (e.g., an HE operation information field or an EHT operation information field as described with reference to FIG. 3) etc.

Operation element format 500 may illustrate an example format of an operation element distributed (e.g., signaled or broadcast) by an AP in a basic operation set (e.g., to establish or maintain a BSS). The AP may signal an operation element (e.g., according to example operation element format 500 within, for example, a management frame) to indicate a dual band channel bonding configuration may include channel bonding with segments in different frequency bands (e.g., a dual band channel bonding configuration with a first channel center frequency segment in the 5 GHz band and a second channel center frequency segment in the 6 GHz band). The dual band channel bonding configurations may be used in accordance with HE, EHT or any other appropriate bonding configurations.

For example, Operation Parameters field 505 (e.g., HE Operation Parameters field or EHT Operation Parameters field) may include a variety of subfields, and may include reserved subfield 510 (e.g., that includes reserved or unused bits). Reserved subfield 510, for example, may include 7 bits. For example, one of the 7 reserved bits of reserved subfield 510 may be designated or configured as a toggle bit indicating whether or not a channel bonding configuration is a dual band channel bonding configuration, as shown in example Table 5.1.

TABLE 5.1

| Field | Value |
| --- | --- |
| Segment 1 in 80 + 80 MHz Indicator | Set to 0 for 80 + 80 MHz BSS Bandwidth, where channel center frequency segment 0 and channel center frequency segment 1 are in the same frequency band<br>Set to 1 for 80 + 80 MHz BSS Bandwidth, where channel center frequency segment 0 and channel center frequency segment 1 are not in the same frequency band<br>NOTE: frequency band for segment 0 is same as primary 20 MHz channel, which is always known. |

In some cases, the reserved bit used to indicate such information may be referred to as a '80+80 MHz PPDU segment 0 and segment 1 in different frequency bands' subfield (e.g., or some other suitable subfield name). When set to 0, the channel width indicated in the first operation information field may equal the channel width indicated in the second (e.g., HE or EHT operation information field (e.g., when a channel bonding configuration is not a dual band channel bonding configuration and both segments are in the same band, the channel widths indicated to both the first class of STAs (e.g., VHT or HE generation-1 STAs) and the second class of STAs (e.g., HE generation-2 STAs or EHT STAs) may be the same). When set to 1, the channel width indicated in the first operation information field may differ from the channel width indicated in the second operation information field (e.g., when a channel bonding configuration is a dual band channel bonding configuration and segments are in different bands, the channel width indicated to both first class of STAs (e.g., VHT or HE generation-1 STAs) and the second class of STAs (e.g., HE generation-2 or EHT STAs differ).

Figure 6:
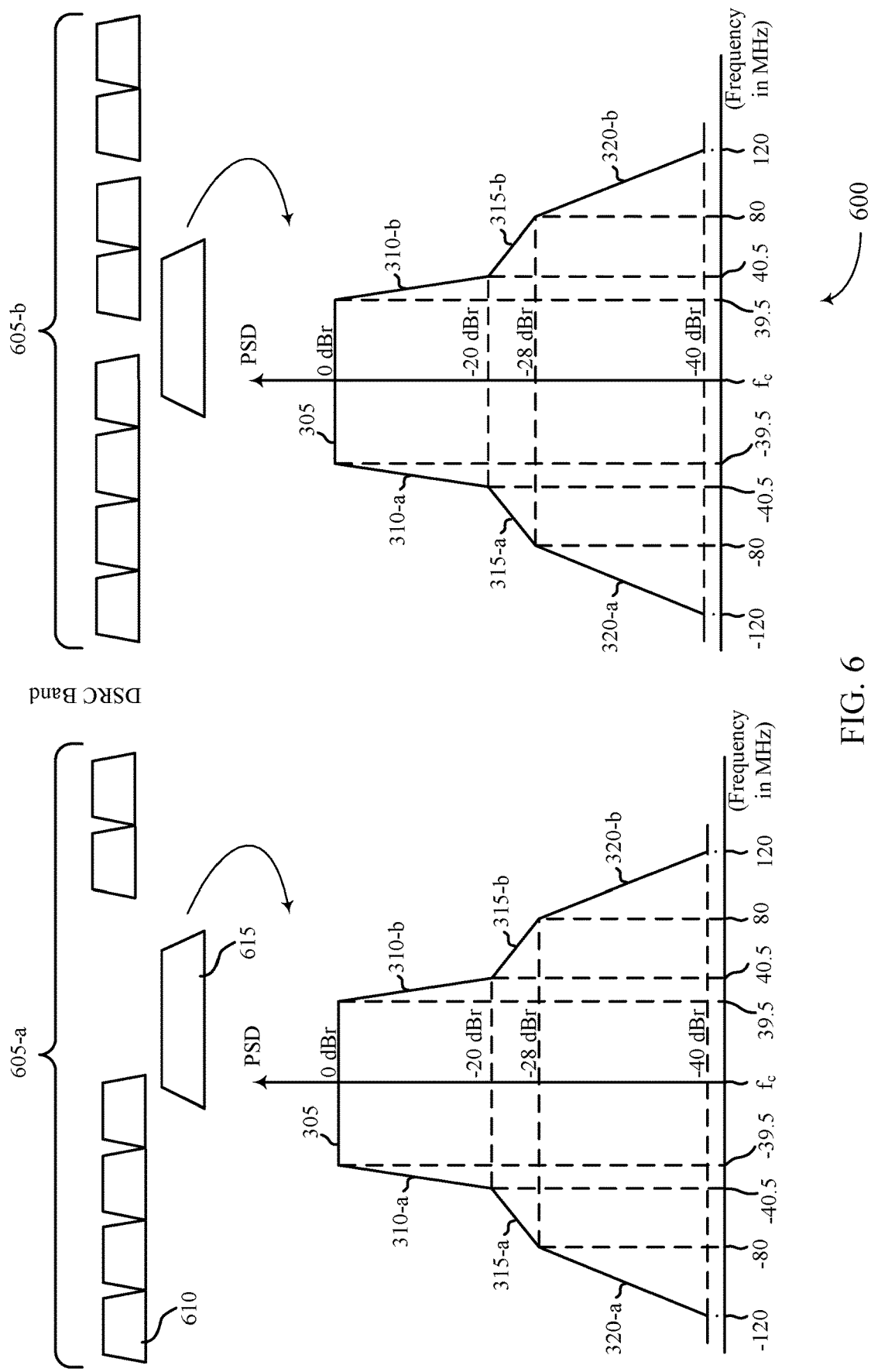
FIG. 6 illustrates an example of a spectral mask diagram that supports dual band channel bonding and puncturing in accordance with aspects of the present disclosure.

FIG. 6 illustrates an example of a spectral mask diagram 600 that supports dual band channel bonding and puncturing in accordance with aspects of the present disclosure. In some examples, spectral mask diagram 600 may implement aspects of WLAN 100 and wireless communications system 200. Spectral mask diagram 600 may illustrate spectral mask definition for PPDUs of dual band channel bonding configurations. As new or additional frequency bands are made available for operation (e.g., such as the 6 GHz band, which may include 5935-7125 MHz), wireless communications systems may support dual band channel bonding. For example, wireless communications systems may support 80+80 MHz BSS bandwidth, where the two 80 MHz segments are in different frequency bands (e.g., one 80 MHz segment in the 5 GHz band and the second 80 MHz segment in the 6 GHz band). The dual band channel bonding configurations may be used in accordance with HE, EHT or any other appropriate bonding configurations.

Spectral mask diagram 600 illustrates frequency band 605-a (e.g., the 5 GHz band) and frequency band 605-b (e.g., the 6 GHz band). Frequency bands 605 may include a number of channels 610 (e.g., each channel 610 may include 20 MHz). For example, frequency band 605-a may include 20 MHz channels #i . . . n, and frequency band 605-b may include 20 MHz channels #i . . . n . . . m. Further, in the scenario where a dual band channel bonding configuration is used, each of frequency band 605-a and frequency band 605-b may include a segment 615 (e.g., a frequency segment). In some examples, each segment 615 may include 80 MHz, or four 20 MHz channels 610, and may be located within a frequency bands 605. As discussed above with reference to FIG. 3, a channel width subfield may indicate a bandwidth spanning from one segment 615 (e.g., segment 0) to the second segment 615 (e.g., segment 1) (e.g., a BSS bandwidth). Further, the channel center frequency segment 0 subfield and channel center frequency segment 1 subfield (e.g., of a second operation information field 310, also described with reference to FIG. 3) may indicate channel center frequencies associated with the segments 615.

In the present example, when segment 0 and segment 1 are in different bands (e.g., when segment 0 is in 5 GHz and segment 1 is in 6 GHz), the spectral mask for 80+80 MHz PPDU may be tightened (e.g., compared to 80+80 MHz PPDUs when both segment 0 and segment 1 are in a same 5 GHz band) to avoid signal leakage. For example, a 80 MHz PPDU spectral mask may be implemented independently for each of the two segments 615.

Figure 7:
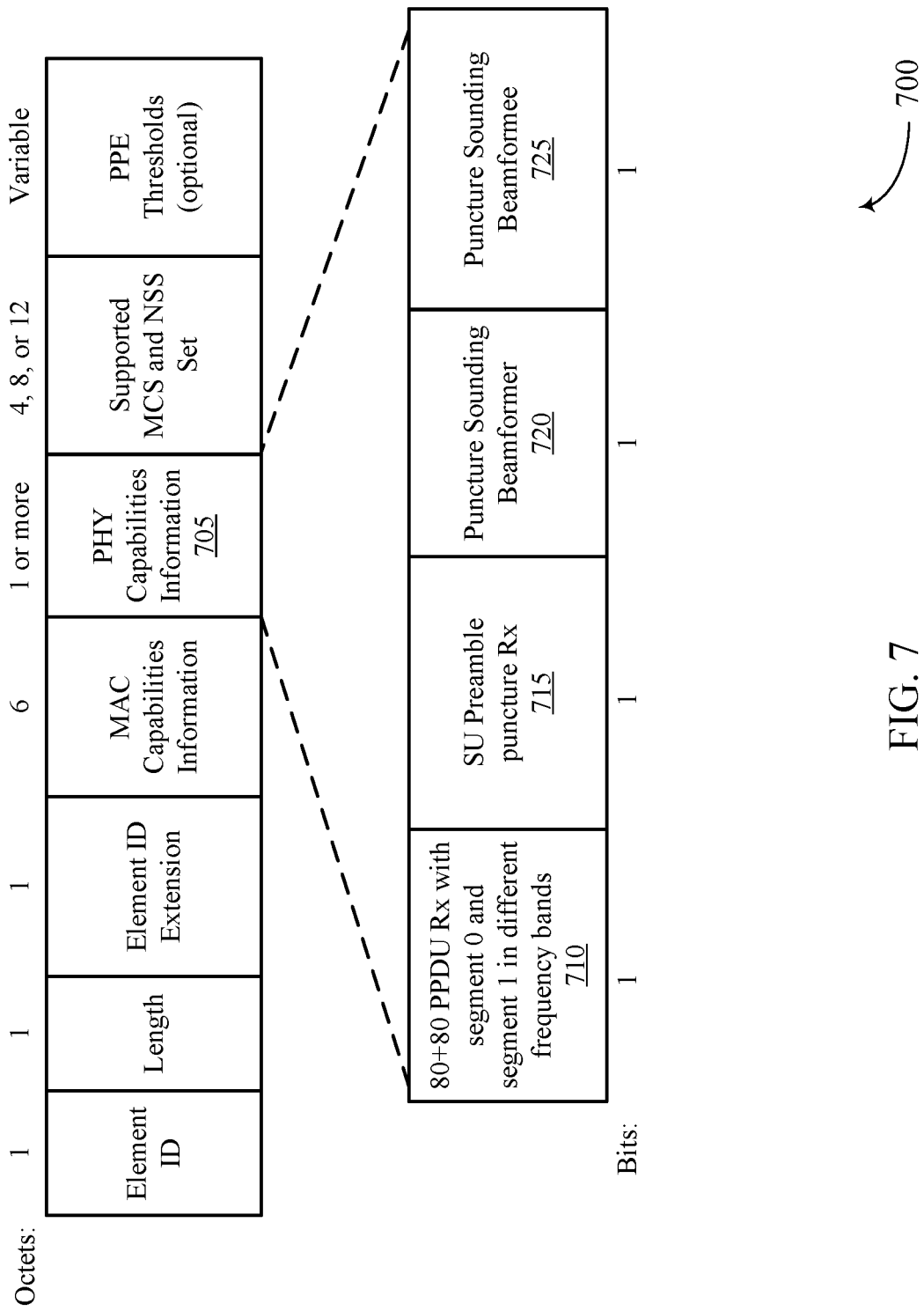
FIG. 7 illustrates an example of a capabilities element format that supports dual band channel bonding and puncturing in accordance with aspects of the present disclosure.

FIG. 7 illustrates an example of a capabilities element format 700 that supports dual band channel bonding and puncturing in accordance with aspects of the present disclosure. In some examples, capabilities element format 700 may implement aspects of WLAN 100 and wireless communications system 200. In some cases, capabilities element format 700 may be used or transmitted by an AP 105 or a STA 115 to indicate capabilities such as dual band channel bonding capabilities, communications puncturing capabilities, etc. Capabilities element format 700 may include several fields or subfields including various information. For example, capabilities element format 700 may include at least a PHY capabilities information field 705 (e.g., an HE PHY capabilities information field or an EHT PHY capabilities information field). Other fields present in a capabilities element format 700 may include, for example, an element ID field, a length field, an element ID extension field, a MAC capabilities information field (e.g., an HE MAC capabilities information field or an EHT MAC capabilities information field), a supported MCS and NSS set field (e.g., an HE MCS and NSS set field or an EHT MCS and NSS set field), a PPE thresholds field, etc.

Capabilities element format 700 may illustrate an example format of a capabilities element signaled by a STA to indicate capabilities such as dual band channel bonding capabilities, communications puncturing capabilities, etc. In some cases, an AP may signal or broadcast a capabilities element to indicate dual band channel bonding capabilities, communications puncturing capabilities, etc., of the AP. For example, PHY capabilities information field 705 (e.g., an HE PHY capabilities information field or an EHT PHY capabilities information field) may include an 80+80 PPDU Rx with segment 0 and segment 1 in different frequency bands subfield 710, a SU preamble puncture Rx subfield 715, a puncture sounding beamformer subfield 720, and puncture sounding beamformee subfield 725. These subfields (e.g., PHY capabilities information field 705) may indicate capabilities such as whether the wireless STA supports a dual band channel bonding configuration, whether the wireless STA supports reception of PPDUs with preamble puncturing, whether the wireless STA supports transmission of PPDUs with preamble puncturing, whether the wireless STA supports operation as a beamformer in puncture sounding procedures, whether the wireless STA supports operation as a beamformee in puncture sounding procedures, etc. (e.g., as shown below in example Table 7.1).

TABLE 7.1

| Subfield | Definition | Encoding |
| --- | --- | --- |
| 80 + 80 MHz PPDU Rx with Segment 0 and segment 1 in different frequency bands | Indicates whether STA supports receiving 80 + 80 MHz PPDU, where 80 MHz segment 0 and 80 MHz segment 1 are in different frequency bands | 0: no support<br>1: support |
| SU Preamble Puncture Rx | Indicates whether STA supports receiving HE or EHT SU PPDU (and HE or EHT ER SU PPDU) with preamble puncture | 0: no support<br>1: support |
| Puncture Sounding Beamformer | Indicates support for operation as a beamformer in puncture sounding procedure | 0: no support<br>1: support |
| Puncture Sounding Beamformee | Indicates support for operation as a beamformee in puncture sounding procedure | 0: no support<br>1: support |

In some cases, the capability information described above (e.g., the subfields of an PHY capabilities information field 705) may be alternatively included in a new subfield of an HE capability element or an EHT capability element (e.g., in some reserved field or newly defined field, instead of in an HE PHY capabilities information field 705 or an EHT PHY capabilities information field).

Figure 8:
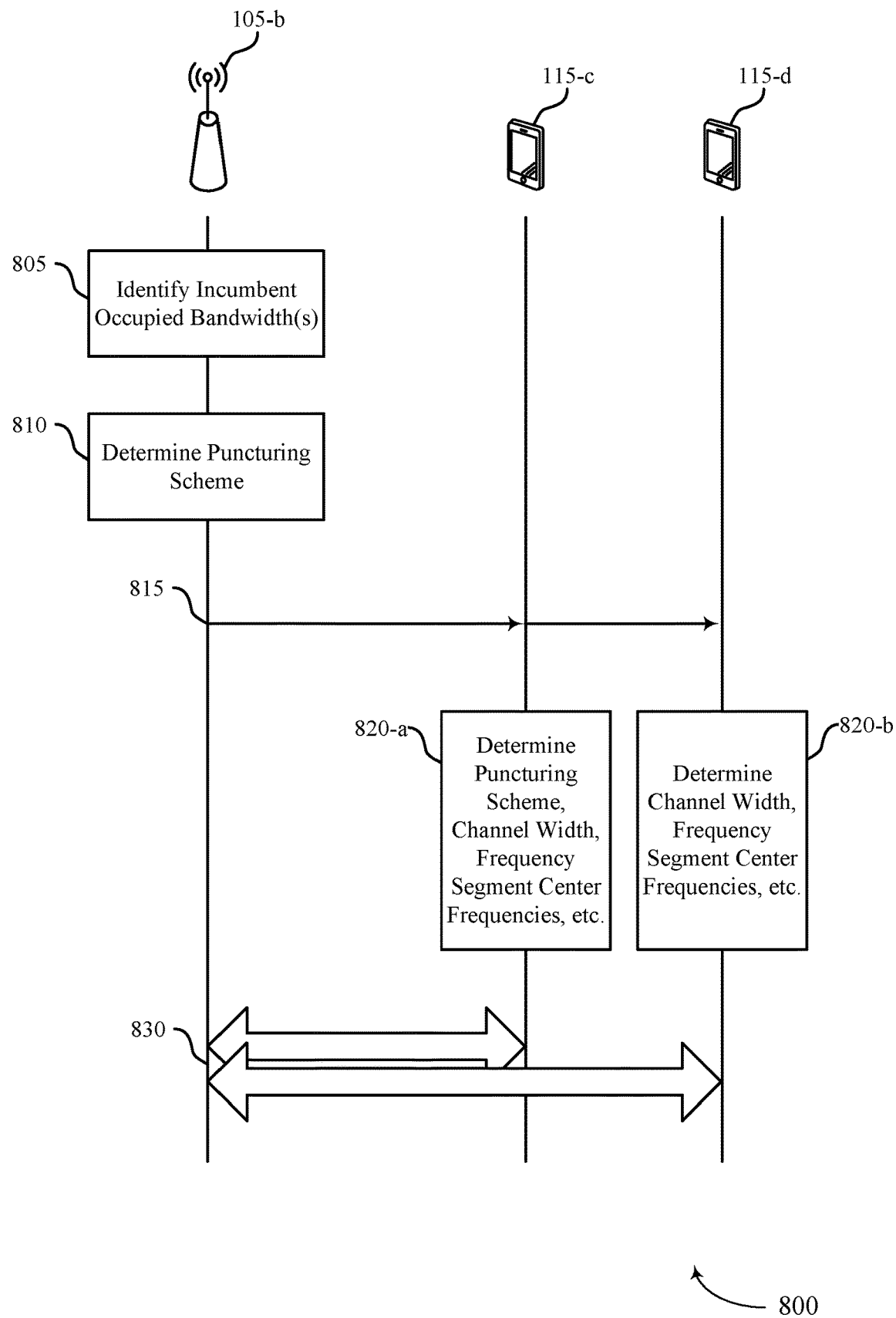
FIG. 8 illustrates an example of a process flow that supports dual band channel bonding and puncturing in accordance with aspects of the present disclosure.

FIG. 8 illustrates an example of a process flow 800 that supports dual band channel bonding and puncturing in accordance with aspects of the present disclosure. In some examples, process flow 800 may implement aspects of WLAN 100 and wireless communications system 200. Process flow 800 includes AP 105-*b*, STA 115-*c*, and STA 115-*d*, which may be examples of APs 105 and STAs 115 as described with reference to FIGS. 1 and 2. Process flow 800 may illustrate AP 105-*b* determining a first channel width for communications with STA 115-*d* (e.g., a STA of a first class of STAs), determining a second channel width and a puncturing scheme for the second channel width for communications with STA 115-*c* (e.g., a STA of a second class of STAs), and transmitting a management frame accordingly. In the following description of the process flow 800, the operations between the AP 105-*b*, the STA 115-*c*, and the STA 115-*d* may be transmitted in a different order than the exemplary order shown, or the operations performed by AP 105-*b*, STA 115-*c*, and STA 115-*d* may be performed in different orders or at different times. In some cases, certain operations may also be left out of the process flow 800, or other operations may be added to the process flow 800 (e.g., some operations of process flow 900, as described with respect to FIG. 9, may be added to process flow 800).

At 805, AP 105-*b* may identify incumbent occupied bandwidths (e.g., bandwidth being using by radar).

At 810, AP 105-*b* may determine a puncturing scheme based at least in part on the incumbent occupied bandwidths identified at 805. In some cases, the puncturing scheme may be determined for each RU or each physical channel associated with the second channel width based on the incumbent occupied bandwidths identified at 805 (e.g., the puncturing scheme may indicate the puncture status for each RU or physical channel within the second channel width). In some cases, determining the puncturing scheme may include determining an 8-bit bitmap that indicates each puncture status. For example, if the second channel width includes 160 MHz, 8 bits may be used to indicate the puncture status of each 242 tone RU or 20 MHz channel within the 160 MHz. In some cases, the 8-bit bitmap may be indicated in a puncture status subfield 345 of an HE operation information field 310, as described with reference to FIG. 3.

At 815, the AP 105-*b* may broadcast a management frame (e.g., including a first operation information field (e.g., a VHT operation information field), and a second operation information field (e.g., an HE operation information field or an EHT operation information field)). The first operation information field may indicate a first channel width for a first class of STAs (e.g., STA 115-*d*) and the second operation information field may indicate a second channel width for a second class of STAs (e.g., STA 115-*c*). In some cases, the first channel width may be based at least in part on the second channel width and the puncturing scheme or the identified incumbent occupied bandwidths. In some cases, the first channel width may be within a first frequency band and the second channel width may be within a first and second frequency band (e.g., where the first frequency band includes a 5 GHz band and the second frequency band includes a 6 GHz band). Both STA 115-*c* and STA 115-*d* may receive the management frame.

At 820, STA 115-*c* may identify the second operation information field, and determine a second channel width, frequency segment center frequencies associated with the second channel width, a puncturing scheme, etc. STA 115-*d* may identify the first operation information field, and determine a first channel width and frequency segment center frequencies associated with the first channel width.

At 830, STA 115-*c* and STA 115-*d* may communicate (e.g., transmit to AP 105-*b* or receive a transmission from AP 105-*b*) using information identified from operation information fields included in the management frame as discussed above. For example, STA 115-*c* may communicate with AP 105-*b* using the second channel width based at least in part on the puncturing scheme (e.g., STA 115-*c* may determine a puncture status for each RU or each physical channel associated with the second channel width based on the indicated puncturing scheme). STA 115-*d* may communicate with AP 105-*b* using the first channel width.

Figure 9:
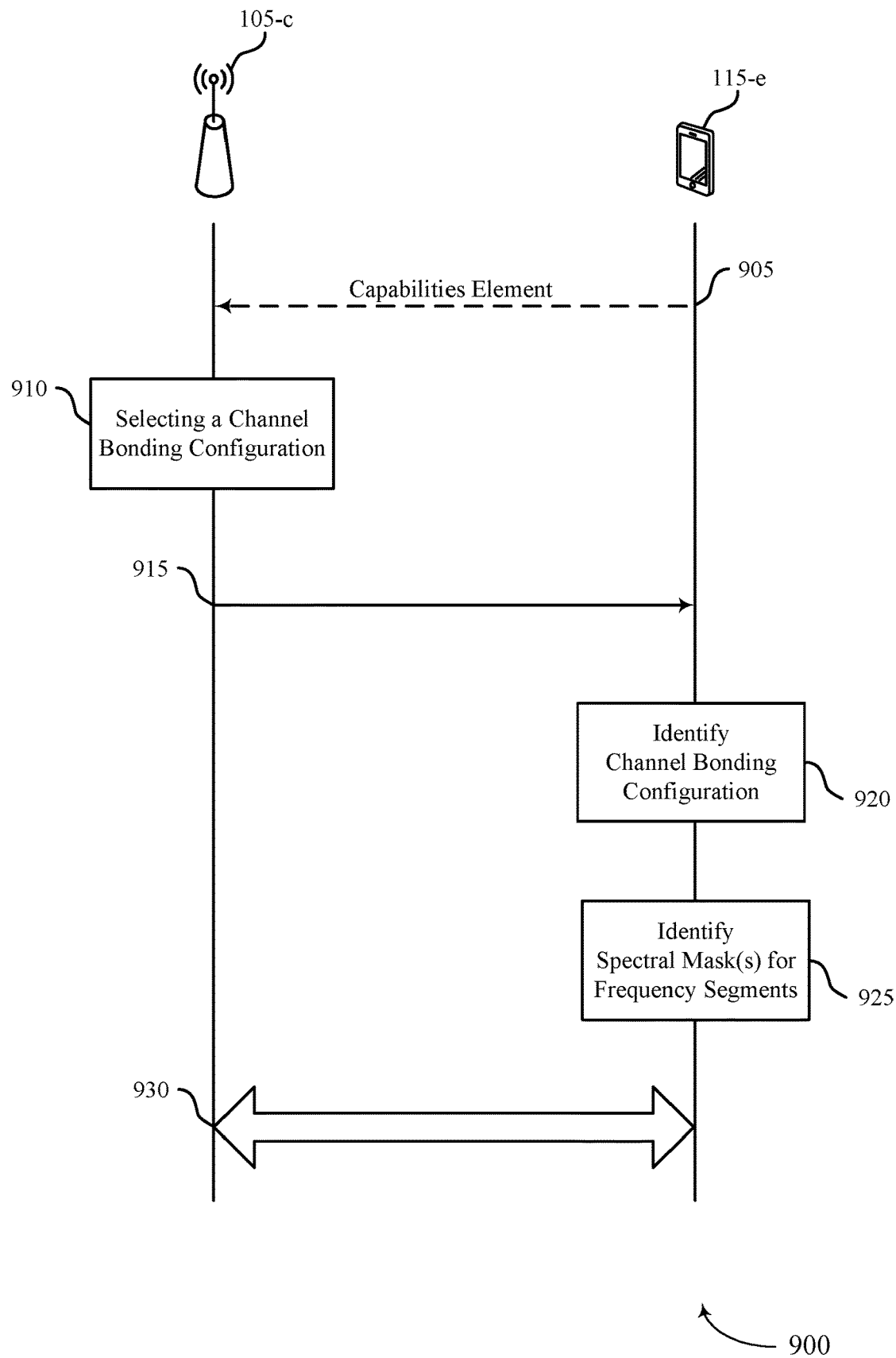
FIG. 9 illustrates an example of a process flow that supports dual band channel bonding and puncturing in accordance with aspects of the present disclosure.

FIG. 9 illustrates an example of a process flow 900 that supports dual band channel bonding and puncturing in accordance with aspects of the present disclosure. In some examples, process flow 900 may implement aspects of WLAN 100 and wireless communications system 200. Process flow 900 includes AP 105-*c* and STA 115-*e*, which may be examples of APs 105 and STAs 115 as described with reference to FIGS. 1 and 2. Process flow 900 may illustrate AP 105-*c* selecting a channel bonding configuration for communications with STA 115-*e* (e.g., a STA of a second class of STAs supporting dual band channel bonding and puncturing), as well as communications between AP 105-*c* and STA 115-*e* utilizing spectral masks based at least in part on the dual channel bonding configuration. In the following description of the process flow 900, the operations between the AP 105-*c* and the STA 115-*e* may be transmitted in a different order than the exemplary order shown, or the operations performed by AP 105-*c* and STA 115-*e* may be performed in different orders or at different times. In some cases, certain operations may also be left out of the process flow 900, or other operations may be added to the process flow 900 (e.g., some operations of process flow 800, as described with respect to FIG. 8, may be added to process flow 900).

At 905, STA 115-*e* may optionally transmit a capabilities element to AP 105-*c*. The capabilities element may indicate whether the STA 115-*e* supports a dual band channel bonding configuration. In some cases, the capabilities element may further indicate whether STA 115-*e* supports reception of PPDUs with preamble puncturing, whether STA 115-*e* supports transmission of PPDUs with preamble puncturing, whether STA 115-*e* supports operation as a beamformer in puncture sounding procedures, whether STA 115-*e* supports operation as a beamformee in puncture sounding procedures, etc.

At 910, AP 105-*c* may select a channel bonding configuration. In some cases, the channel bonding configuration may include a dual band channel bonding configuration with a first frequency segment within a first frequency band and a second frequency segment within a second frequency band. In some cases, the first frequency band includes a 5 GHz band and the second frequency band includes a 6 GHz band. In some cases, AP 105-*c* may additionally identify a spectral mask (e.g., an 80 MHz spectral mask) associated with each frequency segment.

At 915, the AP 105-*c* may broadcast a management frame (e.g., including a first operation information field (e.g., a VHT operation information field), and a second operation information field (e.g., an HE operation information field, or an EHT operation information field)). The first operation information field may indicate a first channel width for a first class of STAs and the second operation information field may indicate a second channel width for a second class of STAs (e.g., STA 115-*e*). In some cases, the first channel width may be based at least in part on the second channel width and the puncturing scheme or the identified incumbent occupied bandwidths. In some cases, the first channel width may be within a first frequency band and the second channel width may be within a first and second frequency band (e.g., where the first frequency band includes a 5 GHz band and the second frequency band includes a 6 GHz band). Further, the management frame may include a dual band channel bonding indication (e.g., an indication of whether the first frequency band and the first frequency band are in a same frequency band, as described with reference to FIG. 5). For example, the management frame may include an indicate that the channel bonding configuration includes frequency segments in different frequency bands (e.g., via a toggle bit indicator), may indicate a channel width (e.g., of 160 MHz), a first frequency segment center frequency, and a second frequency segment center frequency. In some cases, the frequency segments may include 80 MHz, and the first frequency segment may be in the 5 GHz band and the second frequency segment may be in the 6 GHz band.

At 920, STA 115-e may identify the channel bonding configuration based on the operation information field identified in the management frame received at 915. In some cases, STA 115-e may identify the channel bonding configuration is a dual band channel bonding configuration based on the dual band channel bonding indication included in the management frame (e.g., included in an operation parameters field of the management frame (e.g., an HE operation parameters field or an EHT operation parameters field). In some cases, identifying the channel bonding configuration may include identifying the second channel width and the first and second frequency segment center frequencies associated with the second channel width (e.g., where the first and second frequency segment center frequencies are in the 5 GHz band and the 6 GHz band, respectively).

At 925, STA 115-e may identify spectral masks for the first and second frequency segments. In some cases, the first and second spectral masks may each include an 80 MHz spectral mask.

At 930, STA 115-e may communicate with AP 105-c (e.g., transmit to AP 105-c or receive a transmission from AP 105-c) according to the dual band channel bonding configuration identified from the second operation information field included in the management frame, as well as the spectral masks identified at 925. For example, the dual band channel bonding configuration may refer to a second channel width and segment center frequencies associated with the second channel width, where each segment center frequency is within a different frequency band (e.g., segment 0 center frequency may be in 5 GHz and segment 1 center frequency may be in 6 GHz).

Figure 10:
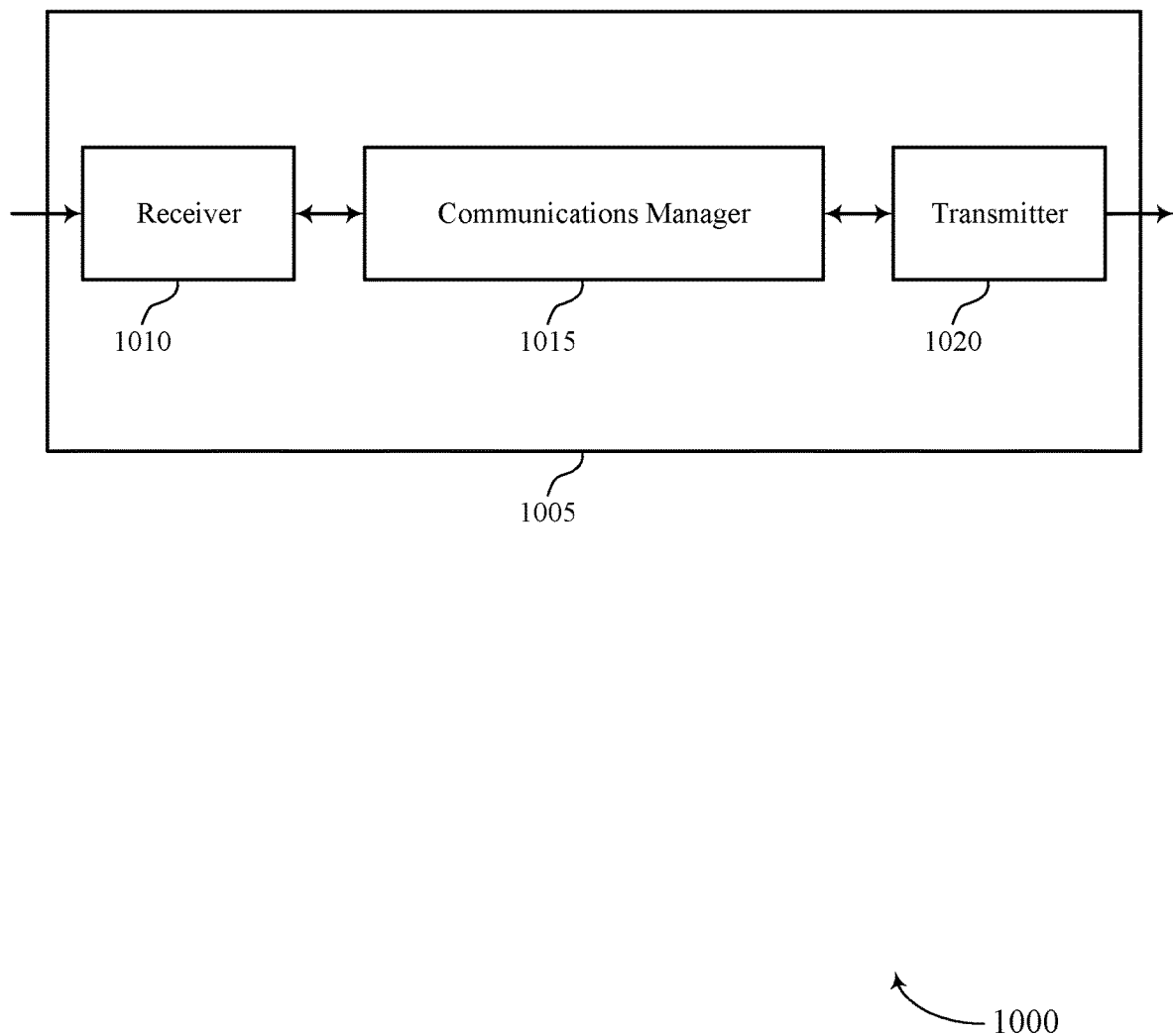
FIGS. 10 and 11 show block diagrams of devices that support dual band channel bonding and puncturing in accordance with aspects of the present disclosure.

FIG. 10 shows a block diagram 1000 of a device 1005 that supports dual band channel bonding and puncturing in accordance with aspects of the present disclosure. The device 1005 may be an example of aspects of a AP as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to dual band channel bonding and puncturing, etc.). Information may be passed on to other components of the device. The receiver 1010 may be an example of aspects of the transceiver 1320 described with reference to FIG. 13. The receiver 1010 may utilize a single antenna or a set of antennas.

The communications manager 1015 may transmit a management frame including a first operation information field indicating a first channel width within a first frequency band, a second operation information field indicating a second channel width within one or both of the first frequency band or a second frequency band and a puncturing scheme for the second channel width and transmit to a wireless STA or receive a transmission from the wireless STA using the second channel width based on the puncturing scheme. The communications manager 1015 may also select a channel bonding configuration based on a first frequency segment within a first frequency band and a second frequency segment within a second frequency band, transmit to a wireless STA or receive a transmission from the wireless STA using the first frequency segment and the second frequency segment based on the selected channel bonding configuration, and transmit a management frame including an operation information field indicating the selected channel bonding configuration. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
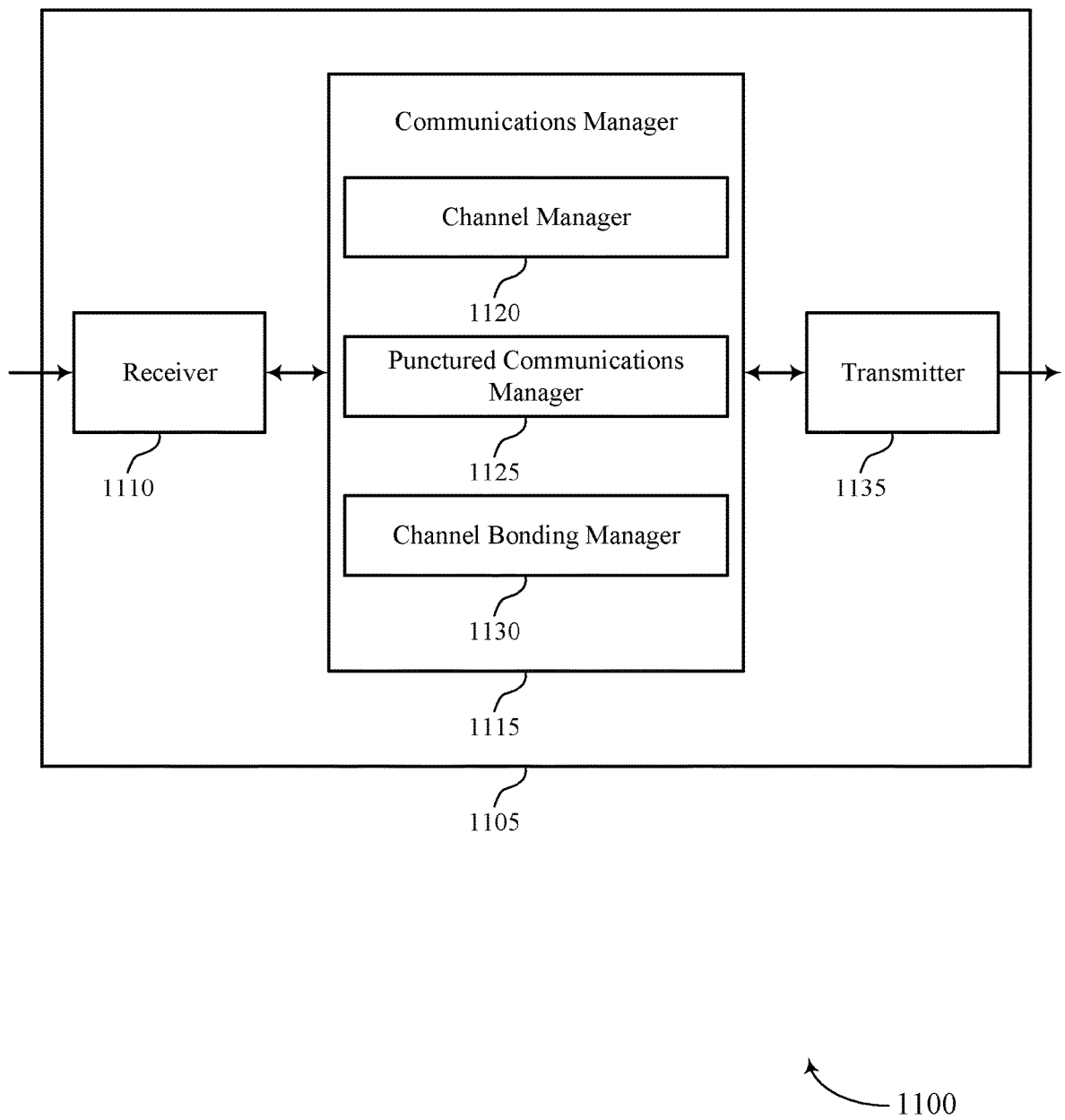

FIG. 11 shows a block diagram 1100 of a device 1105 that supports dual band channel bonding and puncturing in accordance with aspects of the present disclosure. The device 1105 may be an example of aspects of a device 1005 or an AP 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to dual band channel bonding and puncturing, etc.). Information may be passed on to other components of the device. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a channel manager 1120, a punctured communications manager 1125, and a channel bonding manager 1130. The communications manager 1115 may be an example of aspects of the communications manager 1310 described herein.

The channel manager 1120 may transmit a management frame including a first operation information field indicating a first channel width within a first frequency band, a second operation information field indicating a second channel width within one or both of the first frequency band or a second frequency band and a puncturing scheme for the second channel width.

The punctured communications manager 1125 may transmit to a wireless STA or receive a transmission from the wireless STA using the second channel width based on the puncturing scheme.

The channel bonding manager 1130 may select a channel bonding configuration based on a first frequency segment within a first frequency band and a second frequency segment within a second frequency band and transmit to a wireless STA or receive a transmission from the wireless STA using the first frequency segment and the second frequency segment based on the selected channel bonding configuration.

The channel manager 1120 may transmit a management frame including an operation information field indicating the selected channel bonding configuration.

The transmitter 1135 may transmit signals generated by other components of the device. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
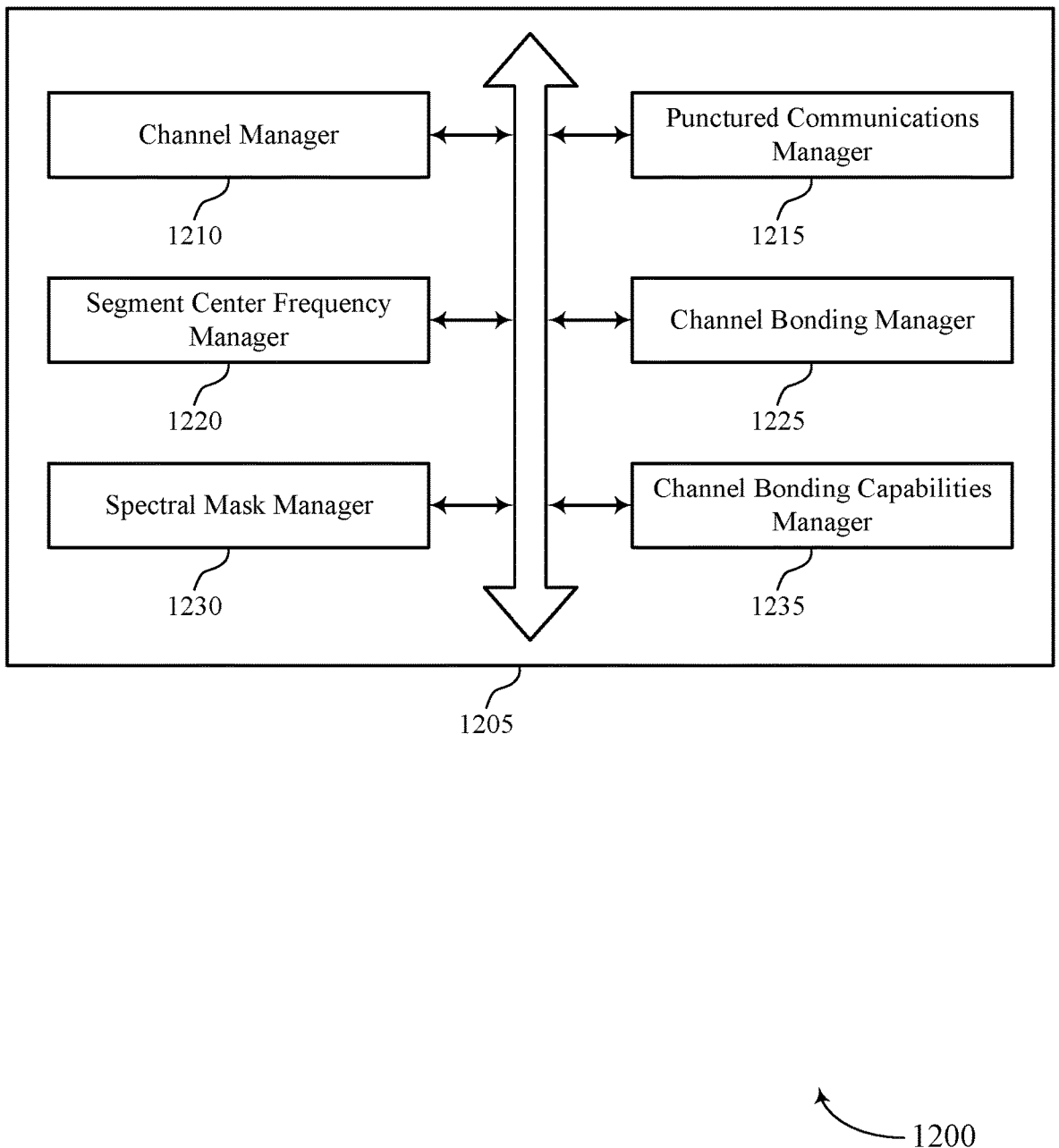
FIG. 12 shows a block diagram of a device that supports dual band channel bonding and puncturing in accordance with aspects of the present disclosure.

FIG. 12 shows a block diagram 1200 of a communications manager 1205 that supports dual band channel bonding and puncturing in accordance with aspects of the present disclosure. The communications manager 1205 may be an example of aspects of a communications manager 1015, a communications manager 1115, or a communications manager 1310 described herein. The communications manager 1205 may include a channel manager 1210, a punctured communications manager 1215, a segment center frequency manager 1220, a channel bonding manager 1225, a spectral mask manager 1230, and a channel bonding capabilities manager 1235. Each of these modules may communicate, directly or indirectly, with one another (e.g., via one or more buses).

The channel manager 1210 may transmit a management frame including a first operation information field indicating a first channel width within a first frequency band, a second operation information field indicating a second channel width within one or both of the first frequency band or a second frequency band and a puncturing scheme for the second channel width. In some examples, the channel manager 1210 may transmit a management frame including an operation information field indicating the selected channel bonding configuration. In some examples, the channel manager 1210 may determine the first channel width associated with the first frequency band and the second channel width associated with one or both of the first frequency band or the second frequency band.

In some cases, the second operation information field indicates the determined second channel width, the determined first channel center frequency, and the determined second channel center frequency. In some cases, the first channel width indicated by the first operation information field is based on the puncturing scheme. In some cases, the first operation information field indicates the determined first channel center frequency and the first channel width. In some cases, the first frequency band includes a 5 GHz band and the second frequency band includes a 6 GHz band. In some cases, the first frequency segment includes an 80 MHz bandwidth, and the second frequency segment includes an 80 MHz bandwidth. In some cases, the management frame further includes an indication of whether the first frequency band and the first frequency band are in a same frequency band.

The punctured communications manager 1215 may transmit to a wireless STA or receive a transmission from the wireless STA using the second channel width based on the puncturing scheme. In some examples, the punctured communications manager 1215 may identify one or more incumbent occupied bandwidths associated with one or more of the first frequency band or the second frequency band. In some examples, the punctured communications manager 1215 may determine a puncture status for each resource unit associated with the second channel width based on the one or more incumbent occupied bandwidths. In some examples, the punctured communications manager 1215 may determine a puncture status for each physical channel within the second channel width based on the one or more incumbent occupied bandwidths. In some examples, punctured communications manager 1215 may determine an eight bit bitmap based on the determined puncture status for each resource unit associated with the second channel width, where the indicated puncturing scheme includes the eight bit bitmap. In some examples, punctured communications manager 1215 may determine an eight bit bitmap based on the determined puncture status for each physical channel within the second channel width, where the indicated puncturing scheme includes the eight bit bitmap.

In some cases, the puncturing scheme is based on the puncture status for each resource unit associated with the second channel width. In some cases, the puncturing scheme is based on the puncture status for each physical channel within the second channel width. In some cases, the second channel width includes 160 MHz and each physical channel within the second channel width includes a 20 MHz channel.

The channel bonding manager 1225 may select a channel bonding configuration based on a first frequency segment within a first frequency band and a second frequency segment within a second frequency band. In some examples, the channel bonding manager 1225 may transmit to a wireless STA or receive a transmission from the wireless STA using the first frequency segment and the second frequency segment based on the selected channel bonding configuration. In some examples, the channel bonding manager 1225 may transmit to the wireless STA using the first frequency segment and the second frequency segment based on the identified first and second spectral masks.

The segment center frequency manager 1220 may determine a first channel center frequency associated with the second channel width. In some examples, the segment center frequency manager 1220 may determine a second channel center frequency associated with the second channel width.

The spectral mask manager 1230 may identify a first spectral mask associated with the first frequency segment. In some examples, the spectral mask manager 1230 may identify a second spectral mask associated with the second frequency segment. In some cases, the first and second spectral masks each include an 80 MHz spectral mask.

The channel bonding capabilities manager 1235 may receive a capabilities element indicating whether the wireless STA supports a channel bonding configuration with the first frequency band and the second frequency band in different frequency bands. In some cases, the capabilities element further indicates whether the wireless STA supports reception of PPDU with preamble puncturing, whether the wireless STA supports transmission of PPDUs with preamble puncturing, whether the wireless STA supports operation as a beamformer in puncture sounding procedures, whether the wireless STA supports operation as a beamformee in puncture sounding procedures, or some combination thereof.

Figure 13:
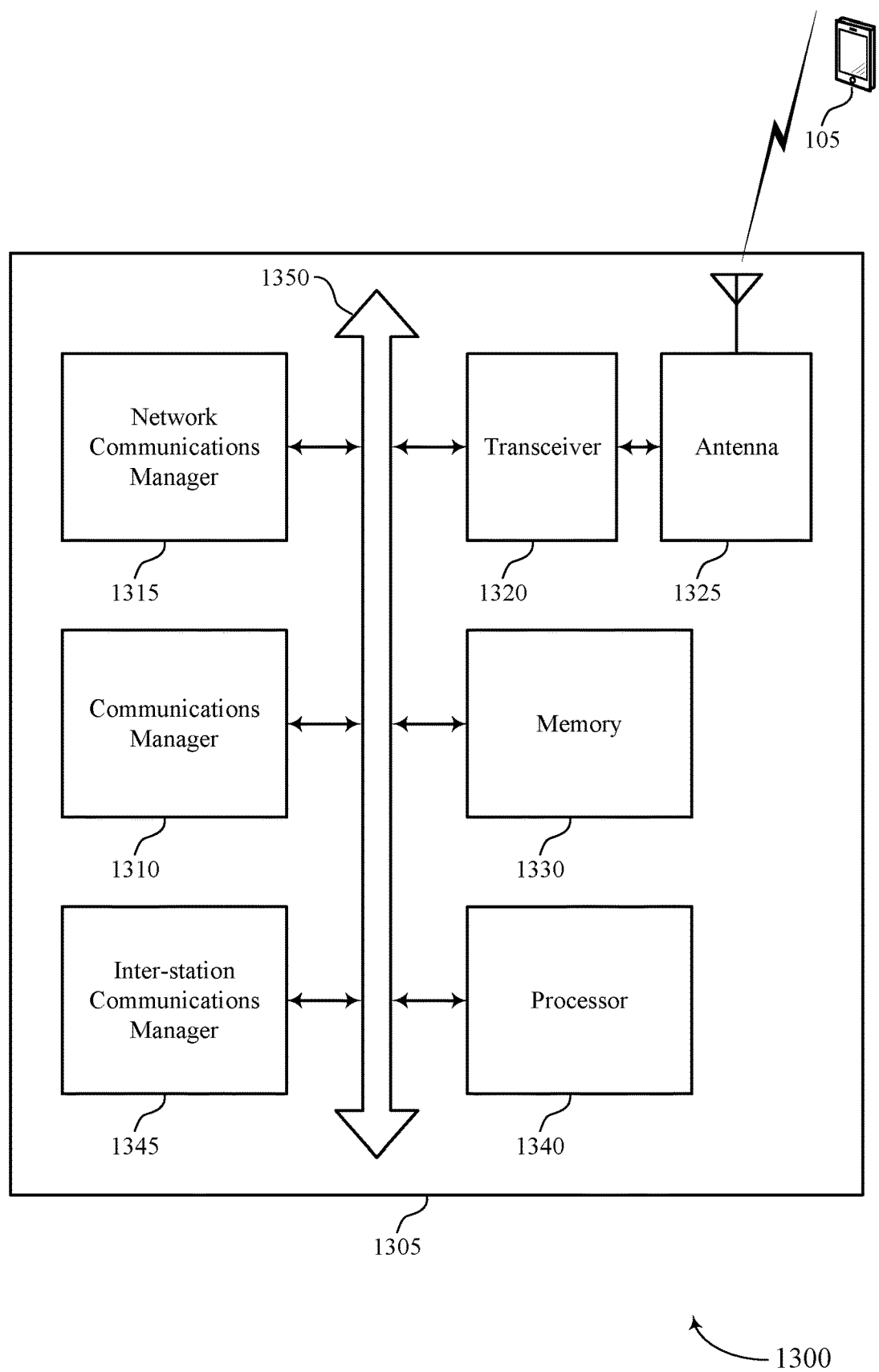
FIG. 13 shows a diagram of a system including a device that supports dual band channel bonding and puncturing in accordance with aspects of the present disclosure.

FIG. 13 shows a diagram of a system 1300 including a device 1305 that supports dual band channel bonding and puncturing in accordance with aspects of the present disclosure. The device 1305 may be an example of or include the components of device 1005, device 1105, or an AP as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a management frame including a first operation information field indicating a first channel width within a first frequency band, a second operation information field indicating a second channel width within one or both of the first frequency band or a second frequency band and a puncturing scheme for the second channel width and transmit to a wireless STA or receive a transmission from the wireless STA using the second channel width based on the puncturing scheme. The communications manager 1310 may also select a channel bonding configuration based on a first frequency segment within a first frequency band and a second frequency segment within a second frequency band, transmit to a wireless STA or receive a transmission from the wireless STA using the first frequency segment and the second frequency segment based on the selected channel bonding configuration, and transmit a management frame including an operation information field indicating the selected channel bonding configuration.

The network communications manager 1315 may manage communications with the core network (e.g., via one or more wired backhaul links). For example, the network communications manager 1315 may manage the transfer of data communications for client devices, such as one or more STAs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into processor 1340. The processor 1340 may be configured to execute computer-readable instructions stored in a memory to perform various functions (e.g., functions or tasks supporting dual band channel bonding and puncturing).

The inter-station communications manager 1345 may manage communications with other APs 105, and may include a controller or scheduler for controlling communications with STAs 115 in cooperation with other APs 105. For example, the inter-station communications manager 1345 may coordinate scheduling for transmissions to STAs 115 for various interference mitigation techniques such as beamforming or joint transmission. In some examples, the inter-station communications manager 1345 may provide an X2 interface within an LTE/LTE-A wireless communication network technology to provide communication between APs 105.

Figure 14:
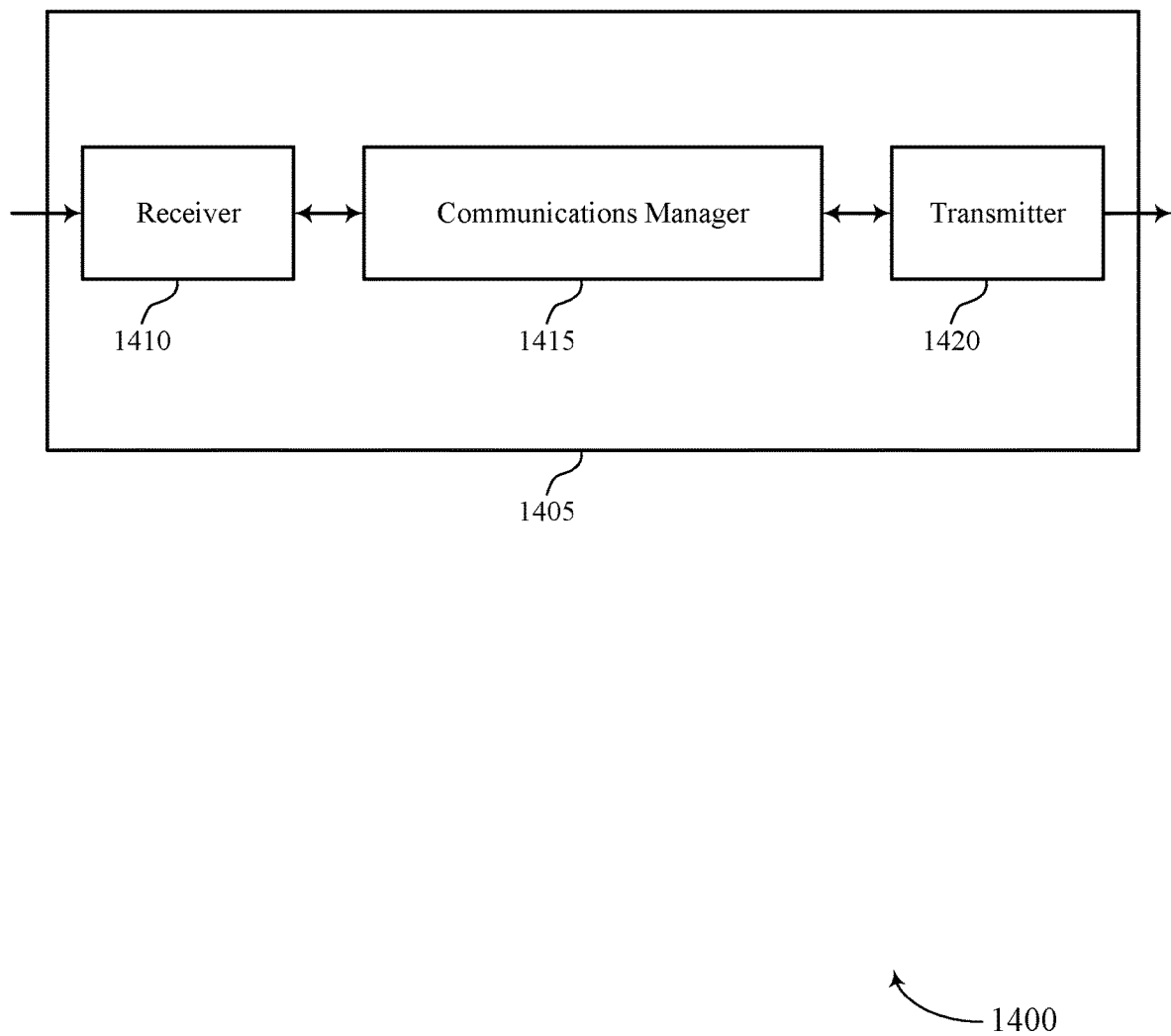
FIGS. 14 and 15 show block diagrams of devices that support dual band channel bonding and puncturing in accordance with aspects of the present disclosure.

FIG. 14 shows a block diagram 1400 of a device 1405 that supports dual band channel bonding and puncturing in accordance with aspects of the present disclosure. The device 1405 may be an example of aspects of a STA as described herein. The device 1405 may include a receiver 1410, a communications manager 1415, and a transmitter 1420. The device 1405 may also include a processor. Each of these components may be in communication with one another (e.g., via one or more buses).

Receiver 1410 may receive information such as packets, user data, or control information associated with various information channels (e.g., control channels, data channels, and information related to dual band channel bonding and puncturing, etc.). Information may be passed on to other components of the device. The receiver 1410 may be an example of aspects of the transceiver 1720 described with reference to FIG. 17. The receiver 1410 may utilize a single antenna or a set of antennas.

The communications manager 1415 may receive a management frame including a first operation information field indicating a first channel width within a first frequency band, a second operation information field indicating a second channel width within one or both of the first frequency band or a second frequency band and a puncturing scheme for the second channel width and transmit to an AP or receive a transmission from the AP using the second channel width based on the puncturing scheme. The communications manager 1415 may also receive a management frame including an operation information field and identify a channel bonding configuration based on the operation information field. The channel bonding configuration is based on a first frequency segment within a first frequency band and a second frequency segment within a second frequency band. The communications manager 1415 transmit to an AP or receive a transmission from the AP using the first frequency segment and the second frequency segment based on the identified channel bonding configuration. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
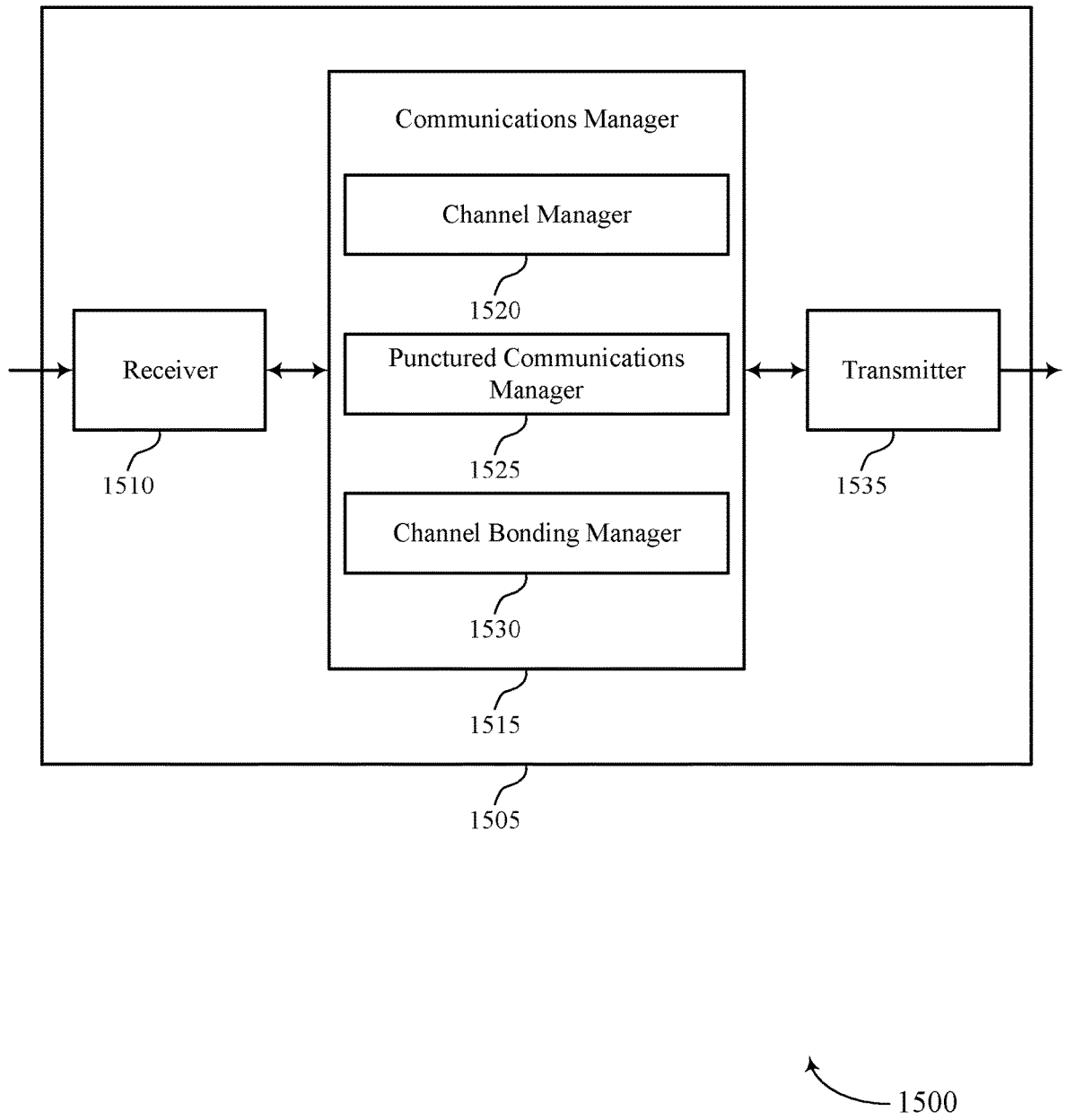

FIG. 15 shows a block diagram 1500 of a device 1505 that supports dual band channel bonding and puncturing in accordance with aspects of the present disclosure. The device 1505 may be an example of aspects of a device 1405 or a STA 115 as described herein. The device 1505 may include a receiver 1510, a communications manager 1515, and a transmitter 1535. The device 1505 may also include a processor. Each of these components may be in communication with one another (e.g., via one or more buses).

Receiver 1510 may receive information such as packets, user data, or control information associated with various information channels (e.g., control channels, data channels, and information related to dual band channel bonding and puncturing, etc.). Information may be passed on to other components of the device. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a channel manager 1520, a punctured communications manager 1525, and a channel bonding manager 1530. The communications manager 1515 may be an example of aspects of the communications manager 1710 described herein.

The channel manager 1520 may receive a management frame including a first operation information field indicating a first channel width within a first frequency band, a second operation information field indicating a second channel width within one or both of the first frequency band or a second frequency band and a puncturing scheme for the second channel width.

The punctured communications manager 1525 may transmit to an AP or receive a transmission from the AP using the second channel width based on the puncturing scheme.

The channel bonding manager 1530 may identify a channel bonding configuration based on the operation information field, where the channel bonding configuration is based on a first frequency segment within a first frequency band and a second frequency segment within a second frequency band and transmit to an AP or receive a transmission from the AP using the first frequency segment and the second frequency segment based on the identified channel bonding configuration.

Transmitter 1535 may transmit signals generated by other components of the device. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
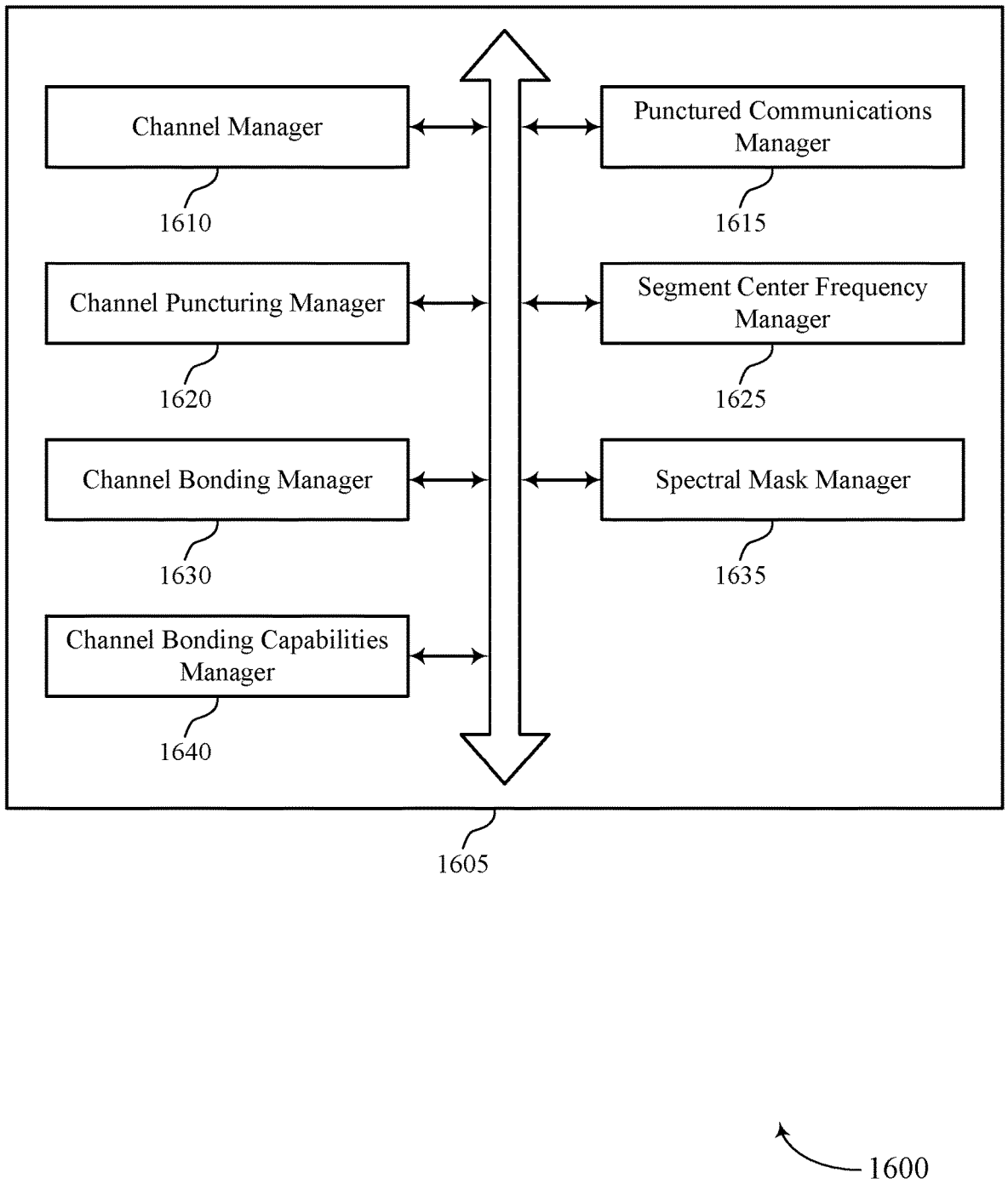
FIG. 16 shows a block diagram of a device that supports dual band channel bonding and puncturing in accordance with aspects of the present disclosure.

FIG. 16 shows a block diagram 1600 of a communications manager 1605 that supports dual band channel bonding and puncturing in accordance with aspects of the present disclosure. The communications manager 1605 may be an example of aspects of a communications manager 1415, a communications manager 1515, or a communications manager 1710 described herein. The communications manager 1605 may include a channel manager 1610, a punctured communications manager 1615, a channel puncturing manager 1620, a segment center frequency manager 1625, a channel bonding manager 1630, a spectral mask manager 1635, and a channel bonding capabilities manager 1640. Each of these modules may communicate, directly or indirectly, with one another (e.g., via one or more buses).

The channel manager 1610 may receive a management frame including a first operation information field indicating a first channel width within a first frequency band, a second operation information field indicating a second channel width within one or both of the first frequency band or a second frequency band and a puncturing scheme for the second channel width. In some examples, the channel manager 1610 may receive a management frame including an operation information field. In some cases, the first channel width is based on the puncturing scheme. In some cases, the first frequency band includes a 5 GHz band and the second frequency band includes a 6 GHz band. In some cases, the management frame further includes an indication of whether the first frequency band and the second frequency band are in a same frequency band.

The punctured communications manager 1615 may transmit to an AP or receive a transmission from the AP using the second channel width based on the puncturing scheme.

The channel bonding manager 1630 may identify a channel bonding configuration based on the operation information field, where the channel bonding configuration is based on a first frequency segment within a first frequency band and a second frequency segment within a second frequency band. In some examples, the channel bonding manager 1630 may transmit to an AP or receive a transmission from the AP using the first frequency segment and the second frequency segment based on the identified channel bonding configuration. In some examples, the channel bonding manager 1630 may transmit to the AP using the first frequency segment and the second frequency segment based on the identified first and second spectral masks. In some cases, the first frequency band includes a 5 GHz band and the second frequency band includes a 6 GHz band. In some cases, the first frequency segment includes an 80 MHz bandwidth, and the second frequency segment includes an 80 MHz bandwidth.

The channel puncturing manager 1620 may determine a puncture status for each resource unit associated with the second channel width based on the indicated puncturing scheme. In some examples, the channel puncturing manager 1620 may transmit to the AP or receiving the transmission from the AP is based on the puncture status for each resource unit associated with the second channel width. In some examples, the channel puncturing manager 1620 may determine a puncture status for each physical channel within the second channel width based on the indicated puncturing scheme. In some examples, the channel puncturing manager 1620 may transmit to the AP or receiving the transmission from the AP is based on the puncture status for each physical channel within the second channel width. In some cases, the second operation element indicates an eight bit bitmap, and the puncture status for each resource unit is determined based on the eight bit bitmap. In some cases, the second operation element indicates an eight bit bitmap, and the puncture status for each physical channel within the second channel width is determined based on the eight bit bitmap.

The segment center frequency manager 1625 may determine, based on the second operation information field, a first channel center frequency associated with the second channel width and a second channel center frequency associated with the second channel width. In some examples, the segment center frequency manager 1625 may transmit to the AP or receiving the transmission from the AP is based on the second channel width, the determined first channel center frequency, and the determined second channel center frequency. In some cases, the second operation information field indicates the second channel width, the first channel center frequency, and the second channel center frequency.

The spectral mask manager 1635 may identify a first spectral mask associated with the first frequency segment. In some examples, the spectral mask manager 1635 may identify a second spectral mask associated with the second frequency segment. In some cases, the first and second spectral masks each include an 80 MHz spectral mask.

The channel bonding capabilities manager 1640 may transmit a capabilities element indicating whether the wireless STA supports a channel bonding configuration with the first frequency band and the second frequency band in different frequency bands. In some cases, the capabilities element further indicates whether the wireless STA supports reception of PPDUs with preamble puncturing, whether the wireless STA supports transmission of PPDUs with preamble puncturing, whether the wireless STA supports operation as a beamformer in puncture sounding procedures, whether the wireless STA supports operation as a beamformee in puncture sounding procedures, or some combination thereof.

Figure 17:
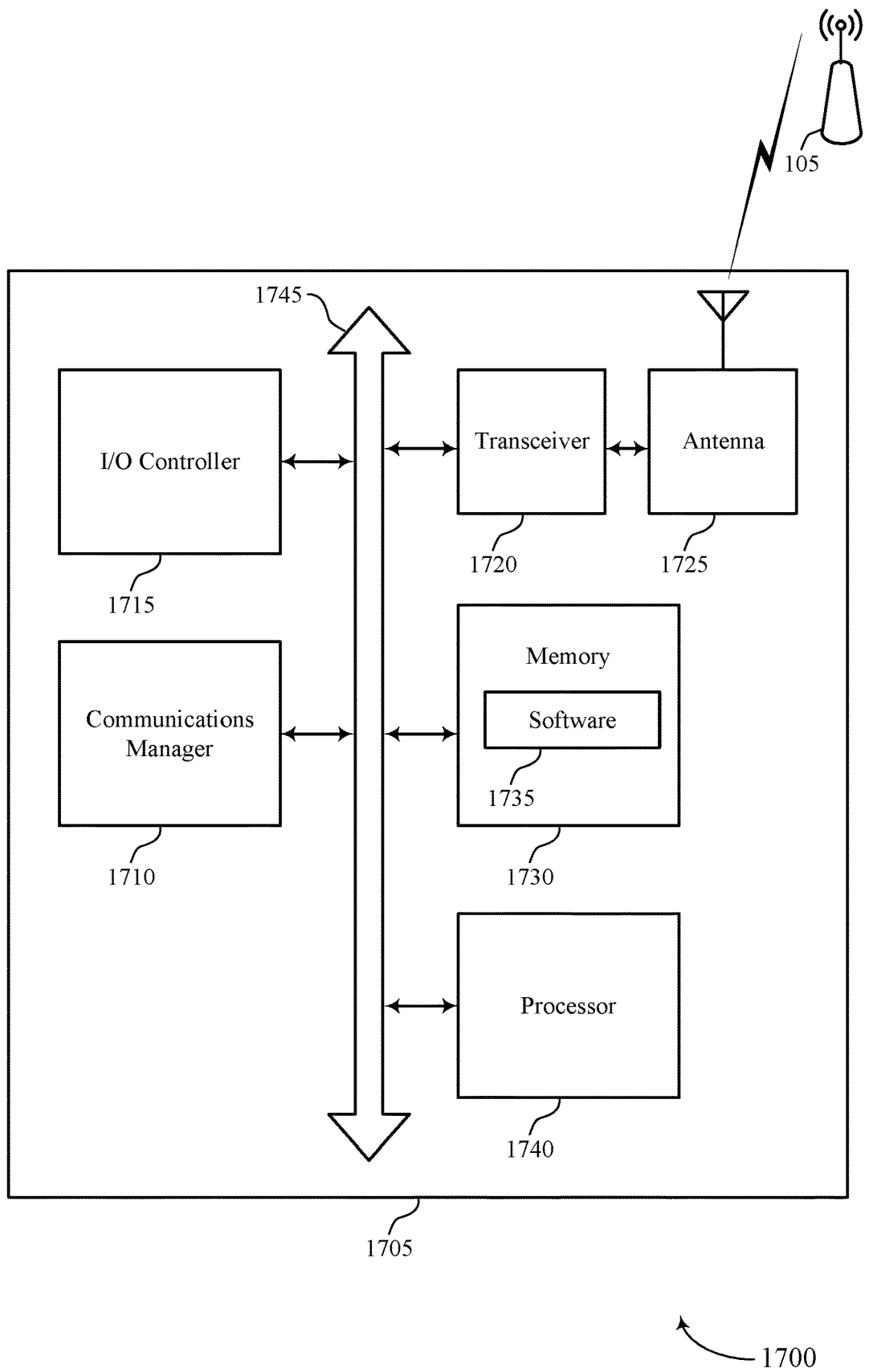
FIG. 17 shows a diagram of a system including a device that supports dual band channel bonding and puncturing in accordance with aspects of the present disclosure.

FIG. 17 shows a diagram of a system 1700 including a device 1705 that supports dual band channel bonding and puncturing in accordance with aspects of the present disclosure. The device 1705 may be an example of or include the components of device 1405, device 1505, or a STA as described herein. The device 1705 may include components for bi-directional voice and data communications including components for transmitting and receiving communications, including a communications manager 1710, an I/O controller 1715, a transceiver 1720, an antenna 1725, memory 1730, and a processor 1740. These components may be in electronic communication via one or more buses (e.g., bus 1745).

The communications manager 1710 may receive a management frame including a first operation information field indicating a first channel width within a first frequency band, a second operation information field indicating a second channel width within one or both of the first frequency band or a second frequency band and a puncturing scheme for the second channel width and transmit to an AP or receive a transmission from the AP using the second channel width based on the puncturing scheme. The communications manager 1710 may also receive a management frame including an operation information field and identify a channel bonding configuration based on the operation information field. The channel bonding configuration may be based on a first frequency segment within a first frequency band and a second frequency segment within a second frequency band. The communications manager 1710 may transmit to an AP or receive a transmission from the AP using the first frequency segment and the second frequency segment based on the identified channel bonding configuration.

I/O controller 1715 may manage input and output signals for device 1705. I/O controller 1715 may also manage peripherals not integrated into device 1705. In some cases, I/O controller 1715 may represent a physical connection or port to an external peripheral. In some cases, I/O controller 1715 may utilize an operating system such as iOS®, ANDROID®, MS-DOS®, MS-WINDOWS®, OS/2®, UNIX®, LINUX®, or another known operating system. In other cases, I/O controller 1715 may represent or interact with a modem, a keyboard, a mouse, a touchscreen, or a similar device. In some cases, I/O controller 1715 may be implemented as part of a processor. In some cases, a user may interact with device 1705 via I/O controller 1715 or via hardware components controlled by I/O controller 1715.

Transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

Memory 1730 may include RAM and ROM. The memory 1730 may store computer-readable, computer-executable software 1735 including instructions that, when executed, cause the processor to perform various functions described herein. In some cases, the memory 1730 may contain, among other things, a BIOS which may control basic hardware or software operation such as the interaction with peripheral components or devices.

Processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1740 may be configured to operate a memory array using a memory controller. In other cases, a memory controller may be integrated into processor 1740. Processor 1740 may be configured to execute computer-readable instructions stored in a memory to perform various functions (e.g., functions or tasks supporting dual band channel bonding and puncturing).

Figure 18:
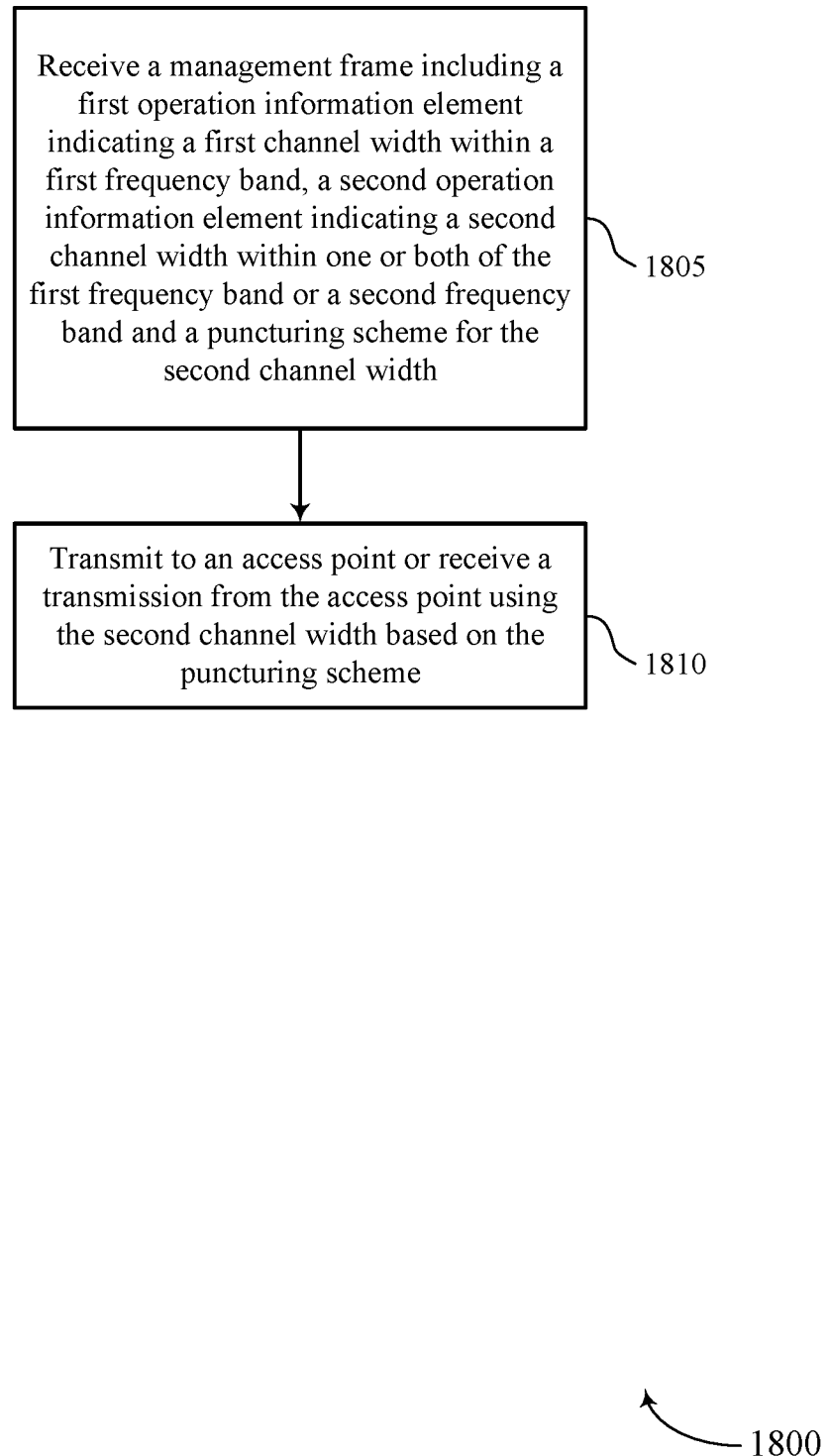
FIGS. 18 through 26 show flowcharts illustrating methods that support dual band channel bonding and puncturing in accordance with aspects of the present disclosure.

FIG. 18 shows a flowchart illustrating a method 1800 that supports dual band channel bonding and puncturing in accordance with aspects of the present disclosure. The operations of method 1800 may be implemented by a STA or its components as described herein. For example, the operations of method 1800 may be performed by a communications manager as described with reference to FIGS. 14 to 17. In some examples, a STA may execute a set of instructions to control the functional elements of the STA to perform the functions described below. Additionally or alternatively, a STA may perform aspects of the functions described below using special-purpose hardware.

At 1805, the STA may receive a management frame including a first operation information field indicating a first channel width within a first frequency band, a second operation information field indicating a second channel width within one or both of the first frequency band or a second frequency band and a puncturing scheme for the second channel width. The operations of 1805 may be performed according to the methods described herein. In some examples, aspects of the operations of 1805 may be performed by a channel manager as described with reference to FIGS. 14 to 17.

At 1810, the STA may transmit to an AP or receive a transmission from the AP using the second channel width based on the puncturing scheme. The operations of 1810 may be performed according to the methods described herein. In some examples, aspects of the operations of 1810 may be performed by a punctured communications manager as described with reference to FIGS. 14 to 17.

Figure 19:
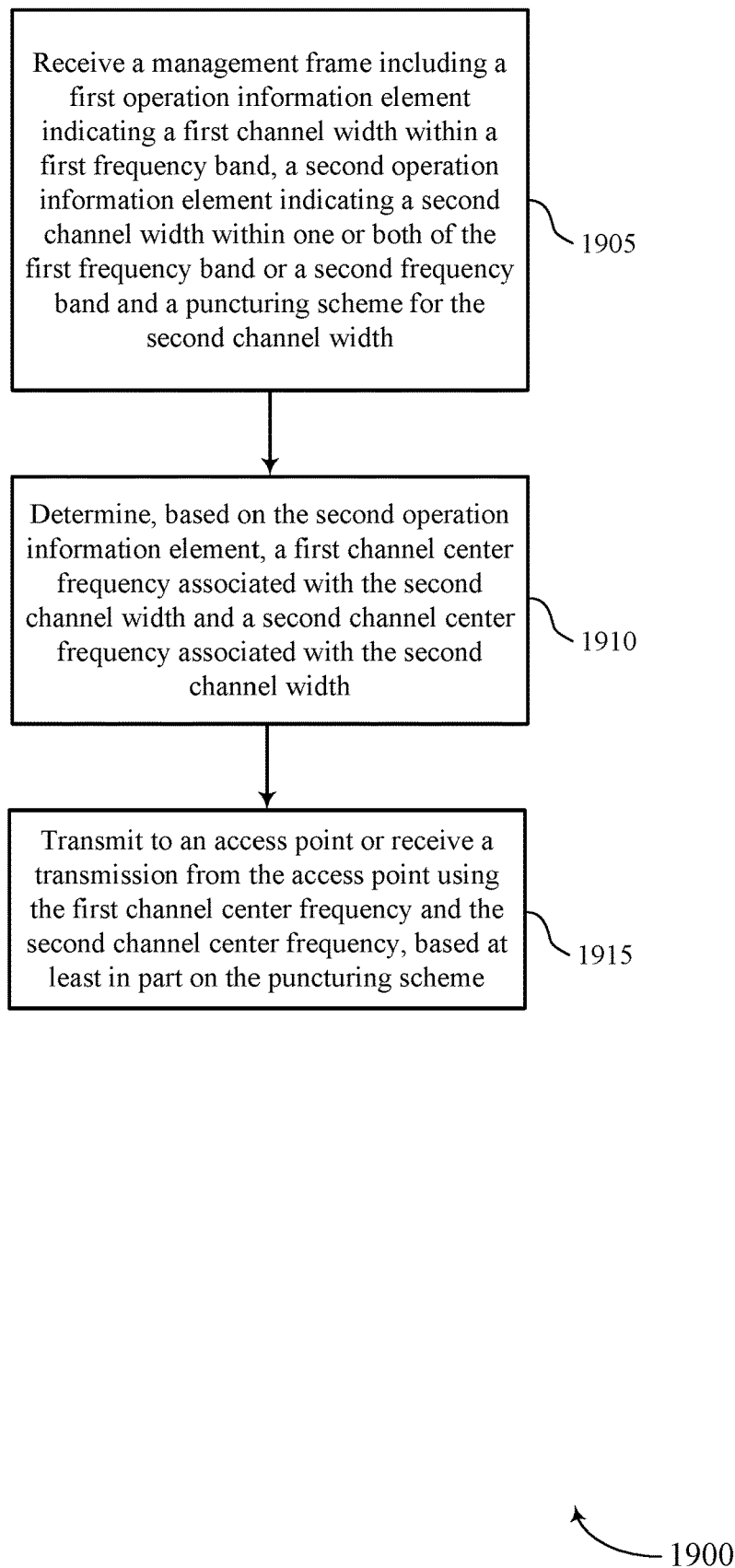

FIG. 19 shows a flowchart illustrating a method 1900 that supports dual band channel bonding and puncturing in accordance with aspects of the present disclosure. The operations of method 1900 may be implemented by a STA or its components as described herein. For example, the operations of method 1900 may be performed by a communications manager as described with reference to FIGS. 14 to 17. In some examples, a STA may execute a set of instructions to control the functional elements of the STA to perform the functions described below. Additionally or alternatively, a STA may perform aspects of the functions described below using special-purpose hardware.

At 1905, the STA may receive a management frame including a first operation information field indicating a first channel width within a first frequency band, a second operation information field indicating a second channel width within one or both of the first frequency band or a second frequency band and a puncturing scheme for the second channel width. The operations of 1905 may be performed according to the methods described herein. In some examples, aspects of the operations of 1905 may be performed by a channel manager as described with reference to FIGS. 14 to 17.

At 1910, the STA may determine, based on the second operation information field, a first channel center frequency associated with the second channel width and a second channel center frequency associated with the second channel width. The operations of 1910 may be performed according to the methods described herein. In some examples, aspects of the operations of 1910 may be performed by a punctured communications manager as described with reference to FIGS. 14 to 17.

At 1915, the STA may transmit to an AP or receive a transmission from the AP using the first channel center frequency and the second channel center frequency, based at least in part on the puncturing. The operations of 1915 may be performed according to the methods described herein. In some examples, aspects of the operations of 1915 may be performed by a segment center frequency manager as described with reference to FIGS. 14 to 17.

Figure 20:
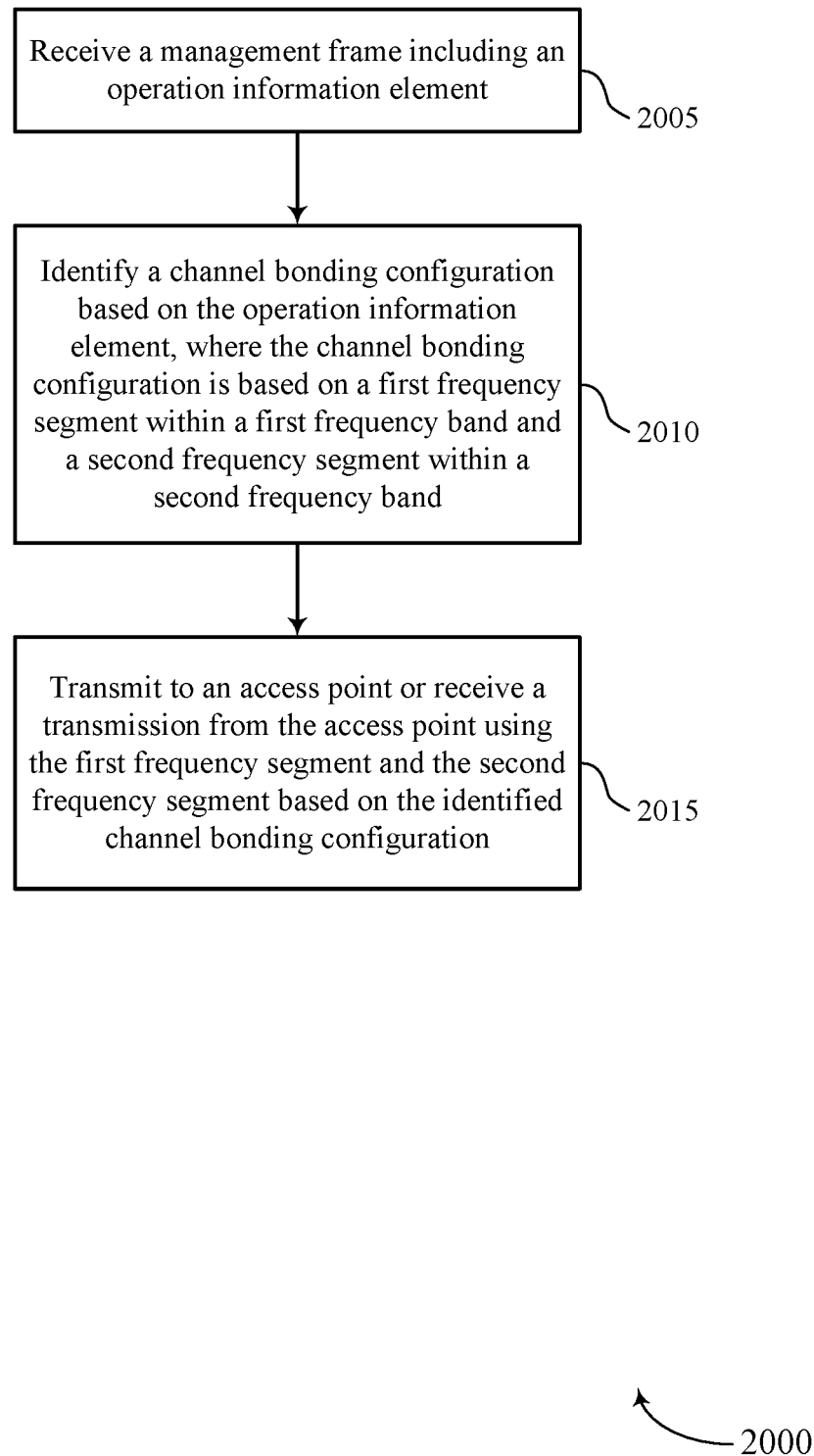

FIG. 20 shows a flowchart illustrating a method 2000 that supports dual band channel bonding and puncturing in accordance with aspects of the present disclosure. The operations of method 2000 may be implemented by a STA or its components as described herein. For example, the operations of method 2000 may be performed by a communications manager as described with reference to FIGS. 14 to 17. In some examples, a STA may execute a set of instructions to control the functional elements of the STA to perform the functions described below. Additionally or alternatively, a STA may perform aspects of the functions described below using special-purpose hardware.

At 2005, the STA may receive a management frame including an operation information field. The operations of 2005 may be performed according to the methods described herein. In some examples, aspects of the operations of 2005 may be performed by a channel manager as described with reference to FIGS. 14 to 17.

At 2010, the STA may identify a channel bonding configuration based on the operation information field, where the channel bonding configuration is based on a first frequency segment within a first frequency band and a second frequency segment within a second frequency band. The operations of 2010 may be performed according to the methods described herein. In some examples, aspects of the operations of 2010 may be performed by a channel bonding manager as described with reference to FIGS. 14 to 17.

At 2015, the STA may transmit to an AP or receive a transmission from the AP using the first frequency segment and the second frequency segment based on the identified channel bonding configuration. The operations of 2015 may be performed according to the methods described herein. In some examples, aspects of the operations of 2015 may be performed by a channel bonding manager as described with reference to FIGS. 14 to 17.

Figure 21:
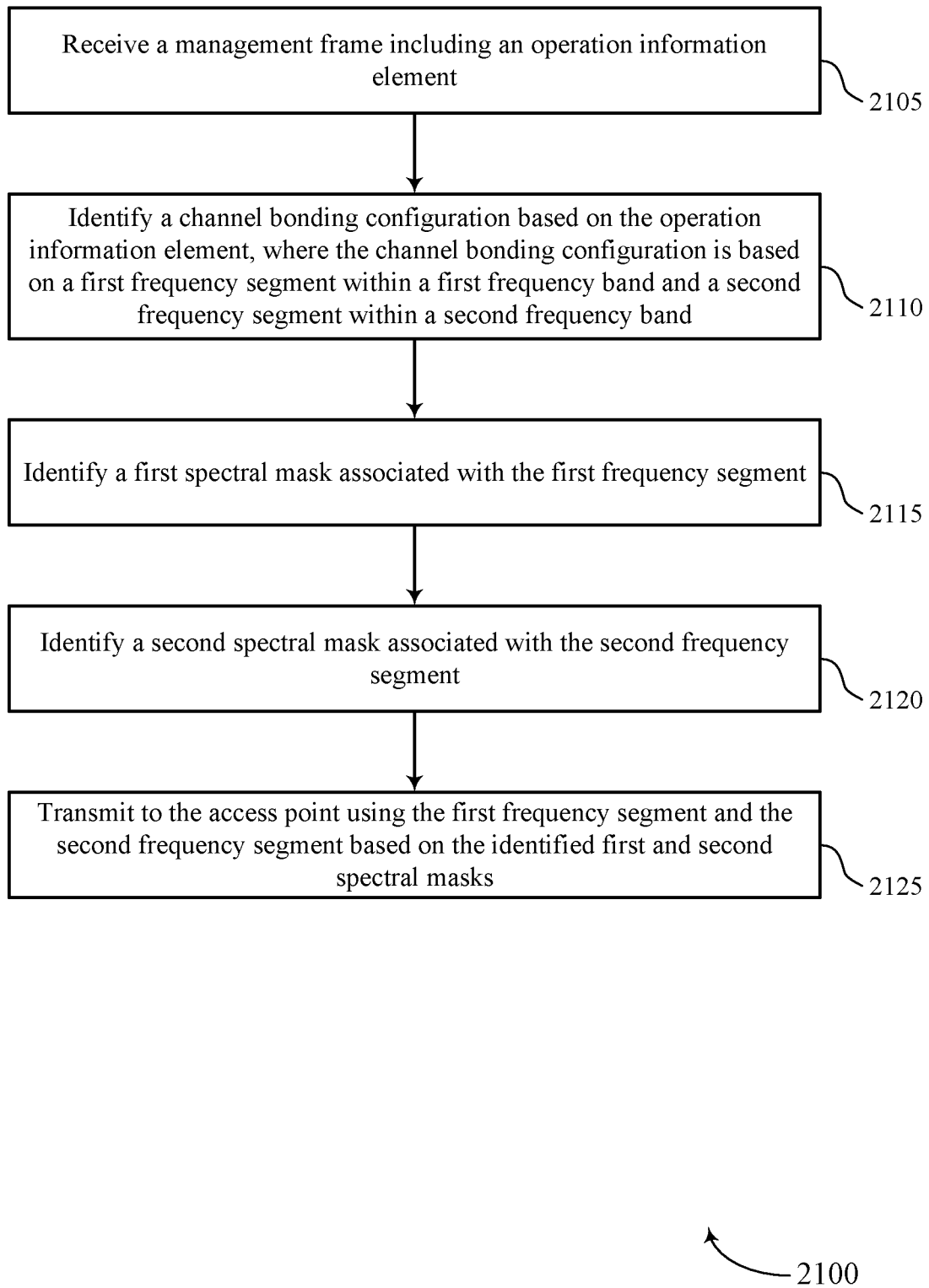

FIG. 21 shows a flowchart illustrating a method 2100 that supports dual band channel bonding and puncturing in accordance with aspects of the present disclosure. The operations of method 2100 may be implemented by a STA or its components as described herein. For example, the operations of method 2100 may be performed by a communications manager as described with reference to FIGS. 14 to 17. In some examples, a STA may execute a set of instructions to control the functional elements of the STA to perform the functions described below. Additionally or alternatively, a STA may perform aspects of the functions described below using special-purpose hardware.

At 2105, the STA may receive a management frame including an operation information field. The operations of 2105 may be performed according to the methods described herein. In some examples, aspects of the operations of 2105 may be performed by a channel manager as described with reference to FIGS. 14 to 17.

At 2110, the STA may identify a channel bonding configuration based on the operation information field, where the channel bonding configuration is based on a first frequency segment within a first frequency band and a second frequency segment within a second frequency band. The operations of 2110 may be performed according to the methods described herein. In some examples, aspects of the operations of 2110 may be performed by a channel bonding manager as described with reference to FIGS. 14 to 17.

At 2115, the STA may identify a first spectral mask associated with the first frequency segment. The operations of 2115 may be performed according to the methods described herein. In some examples, aspects of the operations of 2115 may be performed by a spectral mask manager as described with reference to FIGS. 14 to 17.

At 2120, the STA may identify a second spectral mask associated with the second frequency segment. The operations of 2120 may be performed according to the methods described herein. In some examples, aspects of the operations of 2120 may be performed by a spectral mask manager as described with reference to FIGS. 14 to 17.

At 2125, the STA may transmit to the AP using the first frequency segment and the second frequency segment based on the identified first and second spectral masks. The operations of 2125 may be performed according to the methods described herein. In some examples, aspects of the operations of 2125 may be performed by a channel bonding manager as described with reference to FIGS. 14 to 17.

Figure 22:
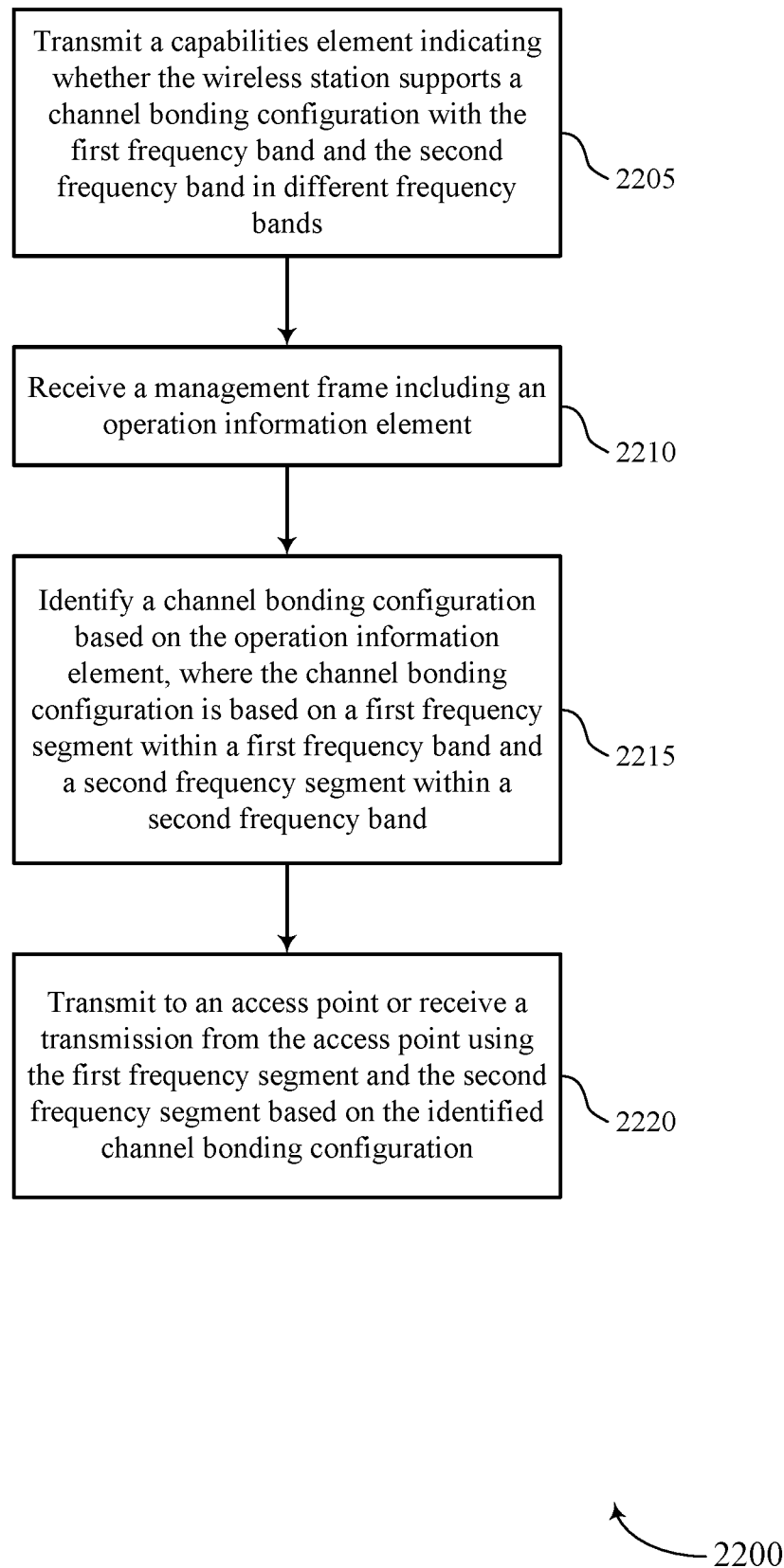

FIG. 22 shows a flowchart illustrating a method 2200 that supports dual band channel bonding and puncturing in accordance with aspects of the present disclosure. The operations of method 2200 may be implemented by a STA or its components as described herein. For example, the operations of method 2200 may be performed by a communications manager as described with reference to FIGS. 14 to 17. In some examples, a STA may execute a set of instructions to control the functional elements of the STA to perform the functions described below. Additionally or alternatively, a STA may perform aspects of the functions described below using special-purpose hardware.

At 2205, the STA may transmit a capabilities element indicating whether the wireless STA supports a channel bonding configuration with the first frequency band and the second frequency band in different frequency bands. The operations of 2205 may be performed according to the methods described herein. In some examples, aspects of the operations of 2205 may be performed by a channel bonding capabilities manager as described with reference to FIGS. 14 to 17.

At 2210, the STA may receive a management frame including an operation information field. The operations of 2210 may be performed according to the methods described herein. In some examples, aspects of the operations of 2210 may be performed by a channel manager as described with reference to FIGS. 14 to 17.

At 2215, the STA may identify a channel bonding configuration based on the operation information field, where the channel bonding configuration is based on a first frequency segment within a first frequency band and a second frequency segment within a second frequency band. The operations of 2215 may be performed according to the methods described herein. In some examples, aspects of the operations of 2215 may be performed by a channel bonding manager as described with reference to FIGS. 14 to 17.

At 2220, the STA may transmit to an AP or receive a transmission from the AP using the first frequency segment and the second frequency segment based on the identified channel bonding configuration. The operations of 2220 may be performed according to the methods described herein. In some examples, aspects of the operations of 2220 may be performed by a channel bonding manager as described with reference to FIGS. 14 to 17.

Figure 23:
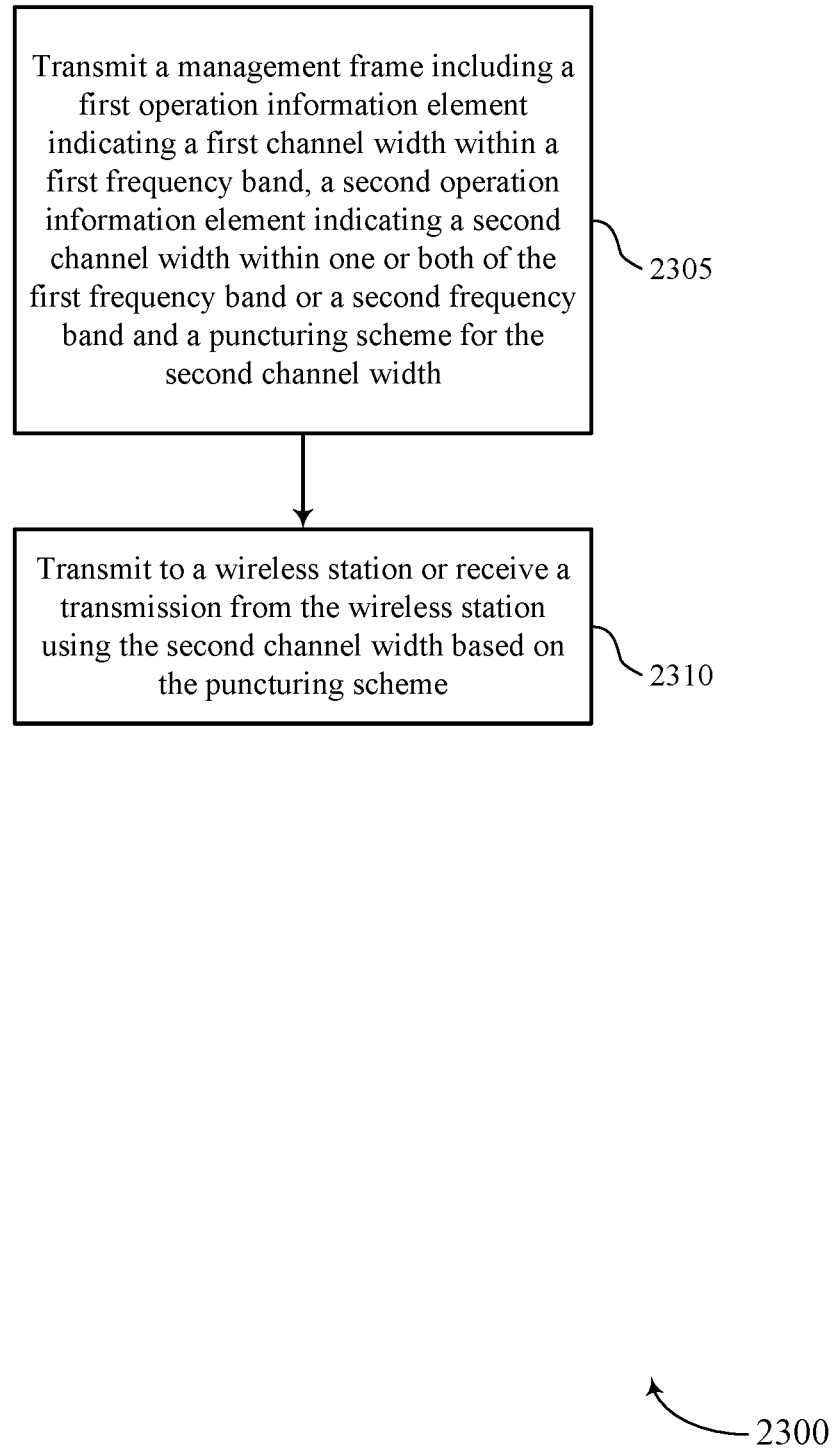

FIG. 23 shows a flowchart illustrating a method 2300 that supports dual band channel bonding and puncturing in accordance with aspects of the present disclosure. The operations of method 2300 may be implemented by a AP or its components as described herein. For example, the operations of method 2300 may be performed by a communications manager as described with reference to FIGS. 10 to 13. In some examples, a AP may execute a set of instructions to control the functional elements of the AP to perform the functions described below. Additionally or alternatively, a AP may perform aspects of the functions described below using special-purpose hardware.

At 2305, the AP may transmit a management frame including a first operation information field indicating a first channel width within a first frequency band, a second operation information field indicating a second channel width within one or both of the first frequency band or a second frequency band and a puncturing scheme for the second channel width. The operations of 2305 may be performed according to the methods described herein. In some examples, aspects of the operations of 2305 may be performed by a channel manager as described with reference to FIGS. 10 to 13.

At 2310, the AP may transmit to a wireless STA or receive a transmission from the wireless STA using the second channel width based on the puncturing scheme. The operations of 2310 may be performed according to the methods described herein. In some examples, aspects of the operations of 2310 may be performed by a punctured communications manager as described with reference to FIGS. 10 to 13.

Figure 24:
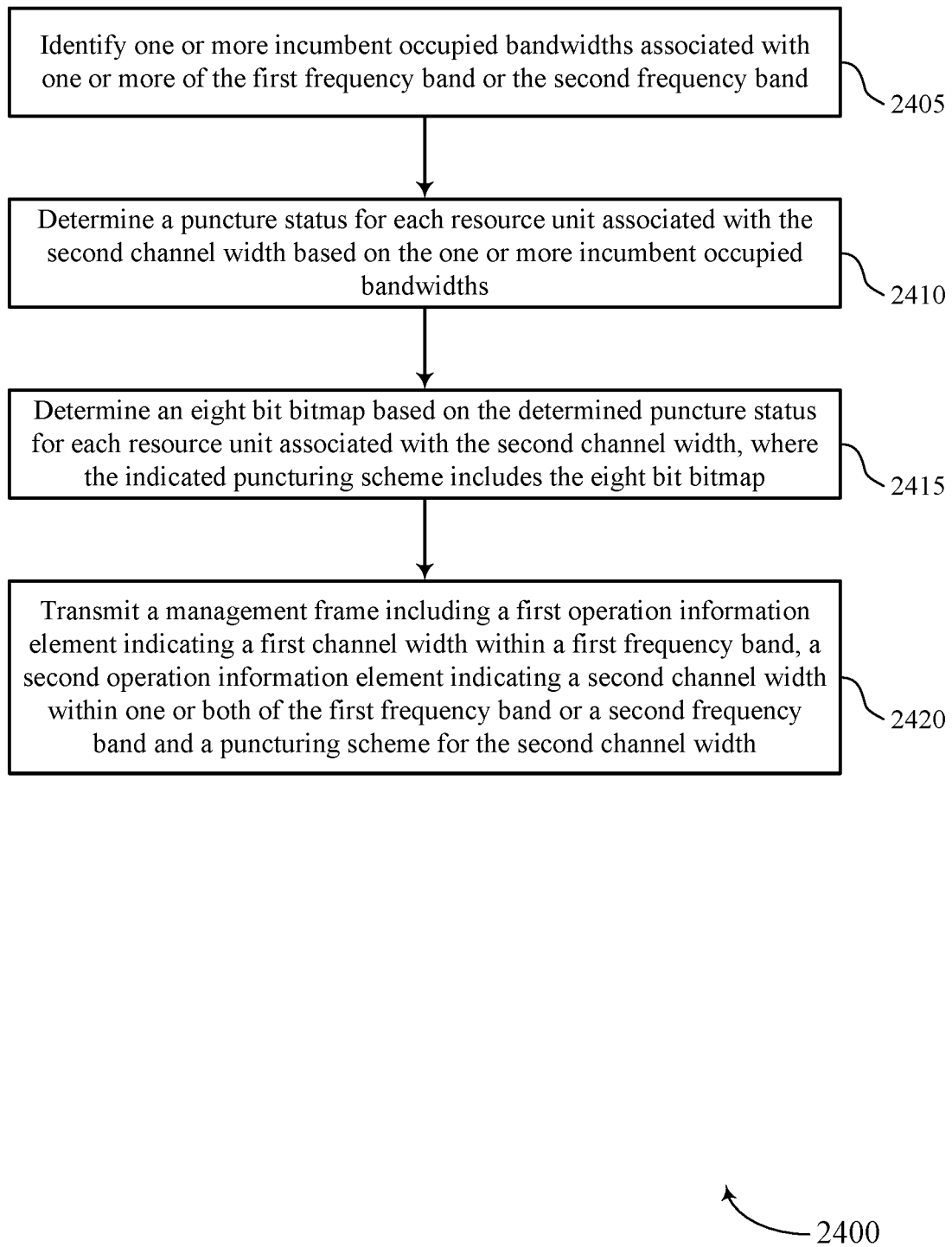

FIG. 24 shows a flowchart illustrating a method 2400 that supports dual band channel bonding and puncturing in accordance with aspects of the present disclosure. The operations of method 2400 may be implemented by a AP or its components as described herein. For example, the operations of method 2400 may be performed by a communications manager as described with reference to FIGS. 10 to 13. In some examples, a AP may execute a set of instructions to control the functional elements of the AP to perform the functions described below. Additionally or alternatively, a AP may perform aspects of the functions described below using special-purpose hardware.

At 2405, the AP may identify one or more incumbent occupied bandwidths associated with one or more of the first frequency band or the second frequency band. The operations of 2405 may be performed according to the methods described herein. In some examples, aspects of the operations of 2405 may be performed by a punctured communications manager as described with reference to FIGS. 10 to 13.

At 2410, the AP may determine a puncture status for each resource unit associated with the second channel width based on the one or more incumbent occupied bandwidths. The operations of 2410 may be performed according to the methods described herein. In some examples, aspects of the operations of 2410 may be performed by a punctured communications manager as described with reference to FIGS. 10 to 13.

At 2415, the AP may determine an eight bit bitmap based on the determined puncture status for each resource unit associated with the second channel width, where the indicated puncturing scheme includes the eight bit bitmap. The operations of 2415 may be performed according to the methods described herein. In some examples, aspects of the operations of 2415 may be performed by a punctured communications manager as described with reference to FIGS. 10 to 13.

At 2420, the AP may transmit a management frame including a first operation information field indicating a first channel width within a first frequency band, a second operation information field indicating a second channel width within one or both of the first frequency band or a second frequency band and a puncturing scheme for the second channel width. The operations of 2420 may be performed according to the methods described herein. In some examples, aspects of the operations of 2420 may be performed by a channel manager as described with reference to FIGS. 10 to 13.

Figure 25:
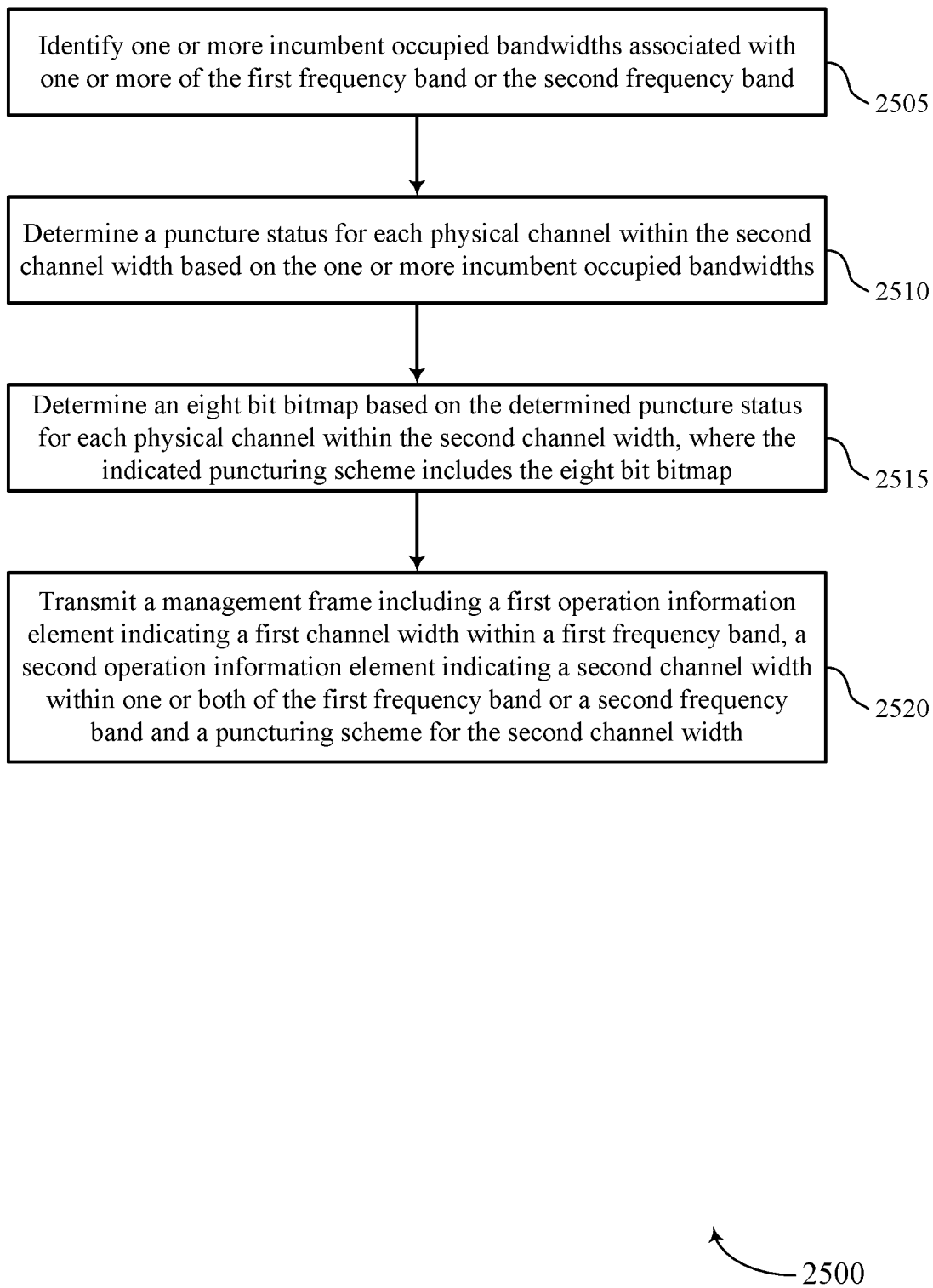

FIG. 25 shows a flowchart illustrating a method 2500 that supports dual band channel bonding and puncturing in accordance with aspects of the present disclosure. The operations of method 2500 may be implemented by a AP or its components as described herein. For example, the operations of method 2500 may be performed by a communications manager as described with reference to FIGS. 10 to 13. In some examples, a AP may execute a set of instructions to control the functional elements of the AP to perform the functions described below. Additionally or alternatively, a AP may perform aspects of the functions described below using special-purpose hardware.

At 2505, the AP may identify one or more incumbent occupied bandwidths associated with one or more of the first frequency band or the second frequency band. The operations of 2505 may be performed according to the methods described herein. In some examples, aspects of the operations of 2505 may be performed by a punctured communications manager as described with reference to FIGS. 10 to 13.

At 2510, the AP may determine a puncture status for each physical channel within the second channel width based on the one or more incumbent occupied bandwidths. The operations of 2510 may be performed according to the methods described herein. In some examples, aspects of the operations of 2510 may be performed by a punctured communications manager as described with reference to FIGS. 10 to 13.

At 2515, the AP may determine an eight bit bitmap based on the determined puncture status for each physical channel within the second channel width, where the indicated puncturing scheme includes the eight bit bitmap. The operations of 2515 may be performed according to the methods described herein. In some examples, aspects of the operations of 2515 may be performed by a punctured communications manager as described with reference to FIGS. 10 to 13.

At 2520, the AP may transmit a management frame including a first operation information field indicating a first channel width within a first frequency band, a second operation information field indicating a second channel width within one or both of the first frequency band or a second frequency band and a puncturing scheme for the second channel width. The operations of 2520 may be performed according to the methods described herein. In some examples, aspects of the operations of 2520 may be performed by a channel manager as described with reference to FIGS. 10 to 13.

Figure 26:
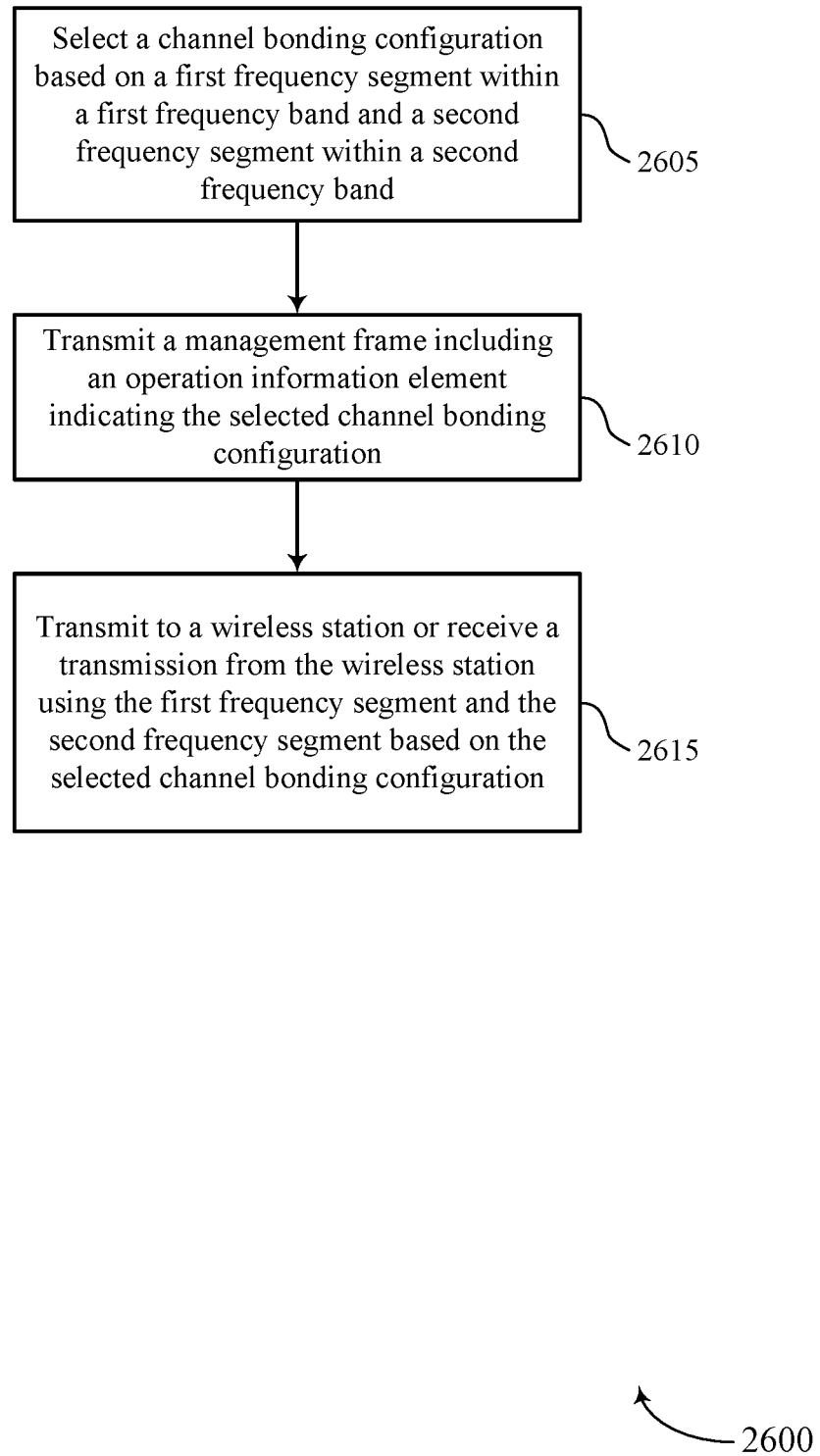

FIG. 26 shows a flowchart illustrating a method 2600 that supports dual band channel bonding and puncturing in accordance with aspects of the present disclosure. The operations of method 2600 may be implemented by a AP or its components as described herein. For example, the operations of method 2600 may be performed by a communications manager as described with reference to FIGS. 10 to 13. In some examples, a AP may execute a set of instructions to control the functional elements of the AP to perform the functions described below. Additionally or alternatively, a AP may perform aspects of the functions described below using special-purpose hardware.

At 2605, the AP may select a channel bonding configuration based on a first frequency segment within a first frequency band and a second frequency segment within a second frequency band. The operations of 2605 may be performed according to the methods described herein. In some examples, aspects of the operations of 2605 may be performed by a channel bonding manager as described with reference to FIGS. 10 to 13.

At 2610, the AP may transmit a management frame including an operation information field indicating the selected channel bonding configuration. The operations of 2610 may be performed according to the methods described herein. In some examples, aspects of the operations of 2610 may be performed by a channel manager as described with reference to FIGS. 10 to 13.

At 2615, the AP may transmit to a wireless STA or receive a transmission from the wireless STA using the first frequency segment and the second frequency segment based on the selected channel bonding configuration. The operations of 2615 may be performed according to the methods described herein. In some examples, aspects of the operations of 2615 may be performed by a channel bonding manager as described with reference to FIGS. 10 to 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the STAs may have similar frame timing, and transmissions from different STAs may be approximately aligned in time. For asynchronous operation, the STAs may have different frame timing, and transmissions from different STAs may not be aligned in time. The techniques described herein may be used for either synchronous or asynchronous operations.

The downlink transmissions described herein may also be called forward link transmissions while the uplink transmissions may also be called reverse link transmissions. Each communication link described herein-including, for example, WLAN 100 and wireless communications system 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising: a processor, memory in electronic communication with the processor; and instructions stored in the memory and executable by the processor to cause the apparatus to:

receive a management frame comprising a field indicating a channel width within at least one of a first frequency band or a second frequency band and a puncturing scheme for the channel width, the channel width comprising resource units, wherein the field comprises a bitmap associated with the puncturing scheme, the bitmap indicating a puncture status for each resource unit of the resource units; and transmit a communication based at least in part on the puncturing scheme to an access point using the channel width after receiving the management frame or receive a transmission based at least in part on the puncturing scheme from the access point using the channel width after receiving the management frame.

2. The apparatus of claim 1, wherein the instructions are further executable by the processor to cause the apparatus to:
determine the puncture status for each resource unit of the resource units associated with the channel width based at least in part on the indicated puncturing scheme.

3. The apparatus of claim 2, wherein the transmission to or the reception from the access point is based at least in part on the puncture status for each resource unit of the resource units associated with the channel width.

4. The apparatus of claim 2, wherein the bitmap comprises eight bits.

5. The apparatus of claim 1, wherein the instructions are further executable by the processor to cause the apparatus to:
determine a puncture status for each physical channel within the channel width based at least in part on the indicated puncturing scheme.

6. The apparatus of claim 5, wherein transmitting to the access point or receiving the transmission from the access point is based at least in part on the puncture status for each physical channel within the channel width.

7. The apparatus of claim 5, wherein the field indicates an eight bit bitmap, and the puncture status for each physical channel within the channel width is determined based at least in part on the eight bit bitmap.

8. The apparatus of claim 1, wherein the instructions are further executable by the processor to cause the apparatus to:
determine, based at least in part on the field, a first channel center frequency associated with the channel width and a second channel center frequency associated with the channel width.

9. The apparatus of claim 8, wherein the field indicates the channel width, the first channel center frequency, and the second channel center frequency.

10. The apparatus of claim 8, wherein transmitting to the access point or receiving the transmission from the access point is based at least in part on the channel width, the determined first channel center frequency, and the determined second channel center frequency.

11. The apparatus of claim 1, wherein the channel width is based at least in part on the puncturing scheme.

12. The apparatus of claim 1, wherein the first frequency band comprises a 5 GHz band and the second frequency band comprises a 6 GHz band.

13. An apparatus for wireless communication, comprising: a processor, memory in electronic communication with the processor; and instructions stored in the memory and executable by the processor to cause the apparatus to:
transmit a management frame comprising a field indicating a channel width within one or both of a first frequency band or a second frequency band and a puncturing scheme for the channel width, the channel width comprising resource units, wherein the field comprises a bitmap associated with the puncturing scheme, the bitmap indicating a puncture status for each resource unit of the resource units; and transmit a communication based at least in part on the puncturing scheme to a wireless station using the channel width after receiving the management frame or receive a transmission based at least in part on the puncturing scheme from the wireless station using the channel width after receiving the management frame.

14. The apparatus of claim 13, wherein the instructions are further executable by the processor to cause the apparatus to:
identify one or more incumbent occupied bandwidths associated with one or more of the first frequency band or the second frequency band.

15. The apparatus of claim 14, wherein the instructions are further executable by the processor to cause the apparatus to:
puncture the one or more incumbent occupied bandwidths.

16. The apparatus of claim 15, wherein the bitmap comprises eight bits.

17. The apparatus of claim 14, wherein the instructions are further executable by the processor to cause the apparatus to:
determine a puncture status for each physical channel within the channel width based at least in part on the one or more incumbent occupied bandwidths.

18. The apparatus of claim 13, wherein the channel width is based at least in part on the puncturing scheme.

19. The apparatus of claim 13, wherein the instructions are further executable by the processor to cause the apparatus to:
determine the channel width associated with at least one of the first frequency band or the second frequency band;
determine a first channel center frequency associated with the channel width; and
determine a second channel center frequency associated with the channel width.

20. A wireless station, comprising:
a receiver to receive a management frame comprising a field indicating a channel width within at least one of a first frequency band or a second frequency band and a puncturing scheme for the channel width, the channel width comprising resource units, wherein the field comprises a bitmap associated with the puncturing scheme, the bitmap indicating a puncture status for each resource unit of the resource units; and
a transmitter to transmit a communication based at least in part on the puncturing scheme to an access point using the channel width after receiving the management frame or receive a transmission based at least in part on the puncturing scheme from the access point using the channel width after receiving the management frame.

21. The wireless station of claim 20, wherein the wireless station further comprises:
a channel puncturing manager to determine the puncture status for each resource unit of the resource units associated with the channel width based at least in part on the indicated puncturing scheme.

22. The wireless station of claim 21, wherein the transmission to or the reception from the access point is based at least in part on the puncture status for each resource unit of the resource units associated with the channel width.

23. The wireless station of claim 21, wherein the bitmap comprises eight bits.

24. The wireless station of claim 20, wherein the wireless station further comprises:
a channel puncturing manager to determine a puncture status for each physical channel within the channel width based at least in part on the indicated puncturing scheme.

25. The wireless station of claim 24, wherein transmitting to the access point or receiving the transmission from the access point is based at least in part on the puncture status for each physical channel within the channel width.

26. The wireless station of claim 24, wherein the field indicates an eight bit bitmap, and the puncture status for each physical channel within the channel width is determined based at least in part on the eight bit bitmap.

27. The wireless station of claim 20, wherein the wireless station further comprises:
a segment center frequency manager to determine, based at least in part on the field, a first channel center frequency associated with the channel width and a second channel center frequency associated with the channel width.

28. The wireless station of claim 27, wherein the field indicates the channel width, the first channel center frequency, and the second channel center frequency.

29. The wireless station of claim 27, wherein transmitting to the access point or receiving the transmission from the access point is based at least in part on the channel width, the determined first channel center frequency, and the determined second channel center frequency.

30. The wireless station of claim 20, wherein the channel width is based at least in part on the puncturing scheme.

31. The wireless station of claim 20, wherein the first frequency band comprises a 5 GHz band and the second frequency band comprises a 6 GHz band.

32. An access point, comprising:
a transmitter to:
transmit a management frame comprising a field indicating a channel width within at least one of a first frequency band or a second frequency band and a puncturing scheme for the channel width, the channel width comprising resource units, wherein the field comprises a bitmap associated with the puncturing scheme, the bitmap indicating a puncture status for each resource unit of the resource units; and
transmit a communication based at least in part on the puncturing scheme to a wireless station using the channel width after receiving the management frame or receive a transmission based at least in part on the puncturing scheme from the wireless station using the channel width after receiving the management frame.

33. The access point of claim 32, the access point further comprising:
a punctured communications manager to identify one or more incumbent occupied bandwidths associated with one or more of the first frequency band or the second frequency band.

34. The access point of claim 33, the access point further comprising:
the punctured communications manager to puncture the one or more incumbent occupied bandwidths.

35. The access point of claim 34, wherein the bitmap comprises eight bits.

36. The access point of claim 33, the access point further comprising:
a channel puncturing manager to determine a puncture status for each physical channel within the channel width based at least in part on the one or more incumbent occupied bandwidths.

37. The access point of claim 32, wherein the channel width indicated by the field is based at least in part on the puncturing scheme.

38. The access point of claim 32, the access point further comprising:
a channel manager to determine the channel width associated with at least one of the first frequency band or the second frequency band;
a segment center frequency manager to:
determine a first channel center frequency associated with the channel width; and
determine a second channel center frequency associated with the channel width.

* * * * *